(12) United States Patent  (10) Patent No.: US 9,119,110 B2
Merlin et al.  (45) Date of Patent: Aug. 25, 2015

(54) REQUEST TO SEND (RTS) AND CLEAR TO SEND (CTS) FOR MULTICHANNEL OPERATIONS

(75) Inventors: Simone Merlin, San Diego, CA (US); Santosh Paul Abraham, San Diego, CA (US); Guido Robert Frederiks, Aptos, CA (US); Vincent Knowles Jones, Redwood City, CA (US); Maarten Menzo Wentink, Naarden (NL)

(73) Assignee: QUALCOMM, Incorporated, San Diego, CA (US)

( * ) Notice: Subject to any disclaimer, the term of this patent is extended or adjusted under 35 U.S.C. 154(b) by 744 days.

(21) Appl. No.: 13/239,206

(22) Filed: Sep. 21, 2011

(65) Prior Publication Data

US 2012/0243485 A1  Sep. 27, 2012

Related U.S. Application Data

(60) Provisional application No. 61/385,462, filed on Sep. 22, 2010, provisional application No. 61/387,744, filed on Sep. 29, 2010, provisional application No. 61/392,456, filed on Oct. 12, 2010.

(51) Int. Cl.
*H04W 4/00* (2009.01)
*H04W 28/20* (2009.01)
*H04W 28/10* (2009.01)
*H04W 28/16* (2009.01)
*H04W 72/04* (2009.01)
*H04W 74/08* (2009.01)

(52) U.S. Cl.
CPC .............. *H04W 28/20* (2013.01); *H04W 28/10* (2013.01); *H04W 28/16* (2013.01); *H04W 72/04* (2013.01); *H04W 74/0816* (2013.01)

(58) Field of Classification Search
None
See application file for complete search history.

(56) References Cited

U.S. PATENT DOCUMENTS 6,577,613 B1 * 6/2003 Ramanathan .................. 370/337
7,113,497 B2 * 9/2006 Cromer et al. ................. 370/338
(Continued)

FOREIGN PATENT DOCUMENTS

CN  1989742 A  6/2007
JP  2013511238 A  3/2013
(Continued)

OTHER PUBLICATIONS

IEEE 802.11; Part 11: Wireless LAN Medium Access Control (MAC) and Physical Layer (PHY) Specifications (Revision of IEEE STD 802.11-1999) (2007).
(Continued)

*Primary Examiner* — Bob Phunkulh
(74) *Attorney, Agent, or Firm* — Dang M. Vo

(57) ABSTRACT

Certain aspects of the present disclosure provide techniques and apparatus for signaling the bandwidth to be used for wireless communications using an RTS/CTS (Request to Send/Clear to Send) frame exchange, providing for bandwidths of at least 20 MHz, 40 MHz, 80 MHz, 160 MHz, or higher. This exchange of bandwidth information may be performed implicitly—by determining the channels in which the RTS/CTS frames are actually sent—or explicitly. In addition to this bandwidth information exchange, aspects of the present disclosure may also allow for Network Allocation Vector (NAV) protection in multiple channels. In this manner, the wireless medium may be reserved, and the transmission may be protected from hidden nodes.

103 Claims, 15 Drawing Sheets

(56) References Cited

U.S. PATENT DOCUMENTS

| | | | |
|---|---|---|---|
| 7,224,679 B2 | 5/2007 | Solomon et al. | |
| 7,463,583 B2 | 12/2008 | Hamdi | |
| 7,796,632 B2 | 9/2010 | Hasty et al. | |
| 7,817,609 B2 | 10/2010 | Law et al. | |
| 7,983,298 B2 | 7/2011 | Nanda et al. | |
| 2003/0210672 A1* | 11/2003 | Cromer et al. | 370/338 |
| 2005/0181800 A1 | 8/2005 | Trachewsky et al. | |
| 2005/0198337 A1* | 9/2005 | Sun et al. | 709/230 |
| 2006/0045059 A1* | 3/2006 | Yun et al. | 370/338 |
| 2006/0050742 A1 | 3/2006 | Grandhi et al. | |
| 2006/0146869 A1 | 7/2006 | Zhang et al. | |
| 2006/0187874 A1 | 8/2006 | Zaki | |
| 2006/0280155 A1 | 12/2006 | Kwon et al. | |
| 2007/0133490 A1 | 6/2007 | Kwon | |
| 2007/0160040 A1* | 7/2007 | Kwon | 370/389 |
| 2007/0217352 A1* | 9/2007 | Kwon | 370/312 |
| 2008/0075038 A1* | 3/2008 | Jin et al. | 370/329 |
| 2008/0080553 A1* | 4/2008 | Hasty et al. | 370/468 |
| 2008/0108366 A1* | 5/2008 | Hu | 455/452.1 |
| 2008/0298306 A1 | 12/2008 | Larsson | |
| 2010/0074198 A1* | 3/2010 | Morioka | 370/329 |
| 2010/0177757 A1* | 7/2010 | Kim et al. | 370/338 |
| 2010/0232411 A1* | 9/2010 | Trachewsky et al. | 370/338 |
| 2011/0038358 A1* | 2/2011 | Wang et al. | 370/338 |
| 2011/0038441 A1* | 2/2011 | Shi | 375/340 |

FOREIGN PATENT DOCUMENTS

| | | |
|---|---|---|
| JP | 2013519331 A | 5/2013 |
| JP | 2013533680 A | 8/2013 |
| JP | 2013538514 A | 10/2013 |
| WO | 2006045097 A2 | 4/2006 |
| WO | 2009154406 A2 | 12/2009 |
| WO | 2010095793 A1 | 8/2010 |
| WO | WO-2011099729 A2 | 8/2011 |
| WO | WO-2011156201 A2 | 12/2011 |
| WO | WO-2012002705 A2 | 1/2012 |
| WO | WO-2012024058 A2 | 2/2012 |

OTHER PUBLICATIONS

IEEE 802.11-10/1066r2 "RTS&CTS Exchange in Wideband Transmission" (Sep. 15, 2010).

IEEE 802.11-10/1096r7 "80MHz/160MHz Protection" (Sep. 14, 2010).

IEEE P802.11ac/D0.1, Draft Standard for Information Technology—Telecommunications and information exchange between systems—Local and metropolitan area networks—Specific requirements Part 11 : Wireless LAN Medium Access Control (MAC) and Physical Layer (PHY) specifications. Amendment 5: Enhancements for Very High Throuput for Operation in Bands below 6 GHz, Jan. 2011, pp. 1-193.

"IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009, pp. 1-536, XP017604244, ISBN: 978-0-7381-6046-7.

International Search Report and Written Opinion—PCT/US2011/052810—ISA/EPO—Dec. 23, 2011.

Gong M., "Medium Access for Wider Bandwidth", IEEE 802.11-10/1084r0, Sep. 12, 2010,URL https://mentor.ieee.org/802.11/dcn/10/11-10-1084-00-00ac-medium-access-for- wider-bandwidth.pptx.

Taiwan Search Report—TW100134185—TIPO—Apr. 22, 2014.

Taiwan Search Report—TW100134185—TIPO—Mar. 20, 2015.

* cited by examiner

REQUEST TO SEND (RTS) AND CLEAR TO SEND (CTS) FOR MULTICHANNEL OPERATIONS

CROSS-REFERENCE TO RELATED APPLICATIONS

This application claims benefit of U.S. Provisional Patent Application Ser. No. 61/385,462, filed Sep. 22, 2010, U.S. Provisional Patent Application Ser. No. 61/387,744, filed Sep. 29, 2010, and U.S. Provisional Patent Application Ser. No. 61/392,456, filed Oct. 12, 2010, all of which are herein incorporated by reference.

BACKGROUND

1. Field

Certain aspects of the present disclosure generally relate to wireless communications and, more particularly, to exchanging bandwidth information between a transmitting entity and a receiving entity to determine the bandwidth to be used between the two entities for transmitting data.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally relate to exchanging bandwidth information between a transmitting entity and a receiving entity via a control frame mechanism (e.g., an RTS/CTS mechanism) to determine the data-transmission bandwidth to be used between the two entities.

Certain aspects of the present disclosure provide a method for wireless communications. The method generally includes transmitting, to an apparatus, a first control frame indicating a desired bandwidth for transmitting data to the apparatus; receiving a second control frame indicating an available bandwidth of the apparatus; and transmitting the data based on the lesser of the available bandwidth and the desired bandwidth.

Certain aspects of the present disclosure provide an apparatus for wireless communications. The apparatus generally includes a transmitter configured to transmit, to another apparatus, a first control frame indicating a desired bandwidth for transmitting data to the other apparatus; and a receiver configured to receive a second control frame indicating an available bandwidth of the other apparatus, wherein the transmitter is further configured to transmit the data based on the lesser of the available bandwidth and the desired bandwidth.

Certain aspects of the present disclosure provide an apparatus for wireless communications. The apparatus generally includes means for transmitting, to another apparatus, a first control frame indicating a desired bandwidth for transmitting data to the other apparatus; and means for receiving a second control frame indicating an available bandwidth of the other apparatus, wherein the means for transmitting is further configured to transmit the data based on the lesser of the available bandwidth and the desired bandwidth.

Certain aspects of the present disclosure provide a computer-program product for wireless communications. The computer-program product generally includes a computer-readable medium having instructions executable to transmit, to an apparatus, a first control frame indicating a desired bandwidth for transmitting data to the apparatus; to receive a second control frame indicating an available bandwidth of the apparatus; and to transmit the data based on the lesser of the available bandwidth and the desired bandwidth.

Certain aspects of the present disclosure provide an access point. The access point generally includes at least one antenna; a transmitter configured to transmit, to an apparatus via the at least one antenna, a first control frame indicating a desired bandwidth for transmitting data to the apparatus; and a receiver configured to receive a second control frame indicating an available bandwidth of the apparatus, wherein the transmitter is further configured to transmit the data based on the lesser of the available bandwidth and the desired bandwidth.

Certain aspects of the present disclosure provide a method for wireless communications. The method generally includes receiving, at an apparatus, a first control frame indicating a desired bandwidth for sending data to the apparatus; in response to receiving the first control frame, transmitting a second control frame indicating an available bandwidth of the apparatus; and receiving the data sent using the lesser of the available bandwidth and the desired bandwidth.

Certain aspects of the present disclosure provide an apparatus for wireless communications. The apparatus generally includes a receiver configured to receive a first control frame indicating a desired bandwidth for sending data to the apparatus; and a transmitter configured to transmit, in response to receiving the first control frame, a second control frame indicating an available bandwidth of the apparatus, wherein the receiver is further configured to receive the data sent using the lesser of the available bandwidth and the desired bandwidth.

Certain aspects of the present disclosure provide an apparatus for wireless communications. The apparatus generally includes means for receiving a first control frame indicating a desired bandwidth for sending data to the apparatus; and means for transmitting, in response to receiving the first control frame, a second control frame indicating an available bandwidth of the apparatus, wherein the means for receiving is further configured to receive the data sent using the lesser of the available bandwidth and the desired bandwidth.

Certain aspects of the present disclosure provide a computer-program product for wireless communications. The computer-program product generally includes a computer-readable medium having instructions executable to receive, at an apparatus, a first control frame indicating a desired bandwidth for sending data to the apparatus; to transmit, in response to receiving the first control frame, a second control frame indicating an available bandwidth of the apparatus; and to receive the data sent using the lesser of the available bandwidth and the desired bandwidth.

Certain aspects of the present disclosure provide a wireless node. The wireless node generally includes at least one antenna; a receiver configured to receive, via the at least one antenna, a first control frame indicating a desired bandwidth for sending data to the apparatus; and a transmitter configured to transmit, in response to receiving the first control frame, a second control frame indicating an available bandwidth of the apparatus, wherein the receiver is further configured to receive the data sent using the lesser of the available bandwidth and the desired bandwidth.

Certain aspects of the present disclosure provide a method for wireless communications. The method generally includes transmitting, to an apparatus, a first control frame on each of one or more channels desired for transmitting data to the apparatus; receiving a second control frame on each of at least a portion of the channels, wherein the channels in the portion of the channels are available at the apparatus; and transmitting the data using the at least the portion of the channels.

Certain aspects of the present disclosure provide an apparatus for wireless communications. The apparatus generally includes a transmitter configured to transmit, to another apparatus, a first control frame on each of one or more channels desired for transmitting data to the other apparatus; and a receiver configured to receive a second control frame on each of at least a portion of the channels, wherein the channels in the portion of the channels are available at the other apparatus and wherein the transmitter is further configured to transmit the data using the at least the portion of the channels.

Certain aspects of the present disclosure provide an apparatus for wireless communications. The apparatus generally includes means for transmitting, to another apparatus, a first control frame on each of one or more channels desired for transmitting data to the other apparatus; means for receiving a second control frame on each of at least a portion of the channels, wherein the channels in the portion of the channels are available at the other apparatus and wherein the means for transmitting is further configured to transmit the data using the at least the portion of the channels.

Certain aspects of the present disclosure provide a computer-program product for wireless communications. The computer-program product generally includes a computer-readable medium having instructions executable to transmit, to an apparatus, a first control frame on each of one or more channels desired for transmitting data to the apparatus; to receive a second control frame on each of at least a portion of the channels, wherein the channels in the portion of the channels are available at the apparatus; and to transmit the data using the at least the portion of the channels.

Certain aspects of the present disclosure provide an access point. The access point generally includes at least one antenna; a transmitter configured to transmit, to an apparatus via the at least one antenna, a first control frame on each of one or more channels desired for transmitting data to the apparatus; and a receiver configured to receive a second control frame on each of at least a portion of the channels, wherein the channels in the portion of the channels are available at the apparatus and wherein the transmitter is further configured to transmit the data using the at least the portion of the channels.

Certain aspects of the present disclosure provide a method for wireless communications. The method generally includes receiving, at an apparatus, a first control frame on each of one or more channels desired for sending data to the apparatus; in response to receiving the first control frame on each of the channels, transmitting a second control frame on each of at least a portion of the channels, wherein the channels in the portion of the channels are available at the apparatus; and receiving the data sent using the at least the portion of the channels.

Certain aspects of the present disclosure provide an apparatus for wireless communications. The apparatus generally includes a receiver configured to receive a first control frame on each of one or more channels desired for sending data to the apparatus; and a transmitter configured to transmit, in response to receiving the first control frame on each of the channels, a second control frame on each of at least a portion of the channels, wherein the channels in the portion of the channels are available at the apparatus and wherein the receiver is further configured to receive the data sent using the at least the portion of the channels.

Certain aspects of the present disclosure provide an apparatus for wireless communications. The apparatus generally includes means for receiving a first control frame on each of one or more channels desired for sending data to the apparatus; and means for transmitting, in response to receiving the first control frame on each of the channels, a second control frame on each of at least a portion of the channels, wherein the channels in the portion of the channels are available at the apparatus and wherein the means for receiving is further configured to receive the data sent using the at least the portion of the channels.

Certain aspects of the present disclosure provide a computer-program product for wireless communications. The computer-program product generally includes a computer-readable medium having instructions executable to receive, at an apparatus, a first control frame on each of one or more channels desired for sending data to the apparatus; to transmit, in response to receiving the first control frame on each of the channels, a second control frame on each of at least a portion of the channels, wherein the channels in the portion of the channels are available at the apparatus; and to receive the data sent using the at least the portion of the channels.

Certain aspects of the present disclosure provide a wireless node. The wireless node generally includes at least one antenna; a receiver configured to receive, via the at least one antenna, a first control frame on each of one or more channels desired for sending data to the apparatus; and a transmitter configured to transmit, in response to receiving the first control frame on each of the channels, a second control frame on each of at least a portion of the channels, wherein the channels in the portion of the channels are available at the apparatus and wherein the receiver is further configured to receive the data sent using the at least the portion of the channels.

Certain aspects of the present disclosure provide a method for wireless communications. The method generally includes transmitting, to an apparatus, a first control frame via a first bandwidth; receiving a second control frame via the first bandwidth; repeating transmission, to the apparatus, of the first control frame via progressively increasing transmission bandwidths until either: (1) the second control frame is not received in response to the transmitted first control frame at a particular bandwidth, but was received at a bandwidth lower than the particular bandwidth; or (2) the second control frame is received via the lower bandwidth in response to the transmitted first control frame at the particular bandwidth; and transmitting data at the lower bandwidth.

Certain aspects of the present disclosure provide an apparatus for wireless communications. The apparatus generally includes a transmitter configured to transmit, to another apparatus, a first control frame via a first bandwidth; and a receiver configured to receive a second control frame via the first bandwidth, wherein the transmitter is further configured to repeat transmission, to the other apparatus, of the first control frame via progressively increasing transmission bandwidths until either: (1) the second control frame is not received in response to the transmitted first control frame at a particular bandwidth, but was received at a bandwidth lower than the particular bandwidth; or (2) the second control frame is received via the lower bandwidth in response to the transmitted first control frame at the particular bandwidth; wherein the transmitter is further configured to transmit data at the lower bandwidth.

Certain aspects of the present disclosure provide an apparatus for wireless communications. The apparatus generally includes means for transmitting, to another apparatus, a first control frame via a first bandwidth; means for receiving a second control frame via the first bandwidth, wherein the means for transmitting is configured to repeat transmission, to the other apparatus, of the first control frame via progressively increasing transmission bandwidths until either: (1) the second control frame is not received in response to the transmitted first control frame at a particular bandwidth, but was received at a bandwidth lower than the particular bandwidth; or (2) the second control frame is received via the lower bandwidth in response to the transmitted first control frame at the particular bandwidth; wherein the means for transmitting is configured to transmit data at the lower bandwidth.

Certain aspects of the present disclosure provide a computer-program product for wireless communications. The computer-program product generally includes a computer-readable medium having instructions executable to transmit, to an apparatus, a first control frame via a first bandwidth; to receive a second control frame via the first bandwidth; to repeat transmission, to the apparatus, of the first control frame via progressively increasing transmission bandwidths until either: (1) the second control frame is not received in response to the transmitted first control frame at a particular bandwidth, but was received at a bandwidth lower than the particular bandwidth; or (2) the second control frame is received via the lower bandwidth in response to the transmitted first control frame at the particular bandwidth; and to transmit data at the lower bandwidth.

Certain aspects of the present disclosure provide an access point. The access point generally includes at least one antenna; a transmitter configured to transmit, to an apparatus via the at least one antenna, a first control frame via a first bandwidth; and a receiver configured to receive a second control frame via the first bandwidth, wherein the transmitter is further configured to repeat transmission, to the other apparatus, of the first control frame via progressively increasing transmission bandwidths until either: (1) the second control frame is not received in response to the transmitted first control frame at a particular bandwidth, but was received at a bandwidth lower than the particular bandwidth; or (2) the second control frame is received via the lower bandwidth in response to the transmitted first control frame at the particular bandwidth; wherein the transmitter is further configured to transmit data at the lower bandwidth.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
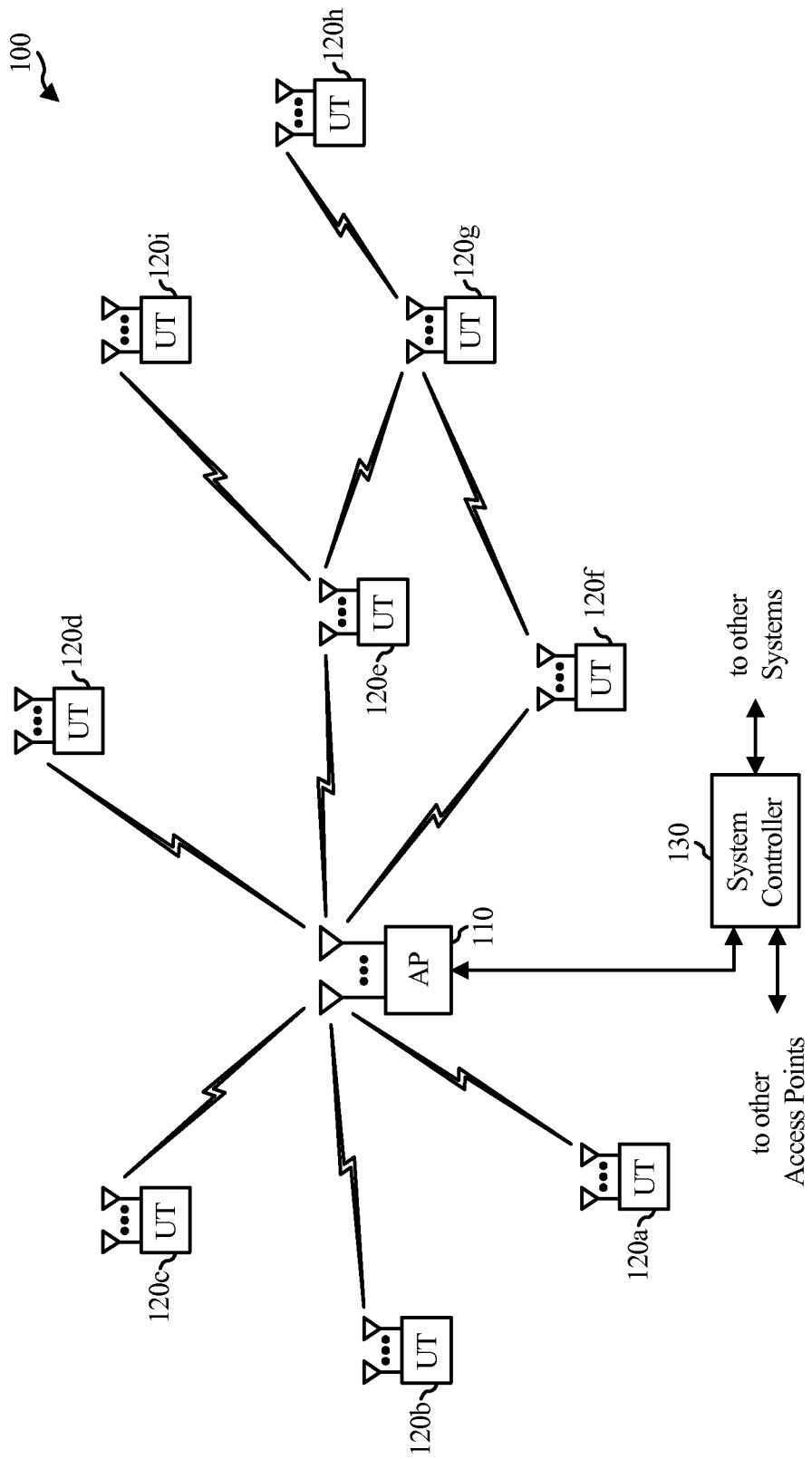
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non- SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
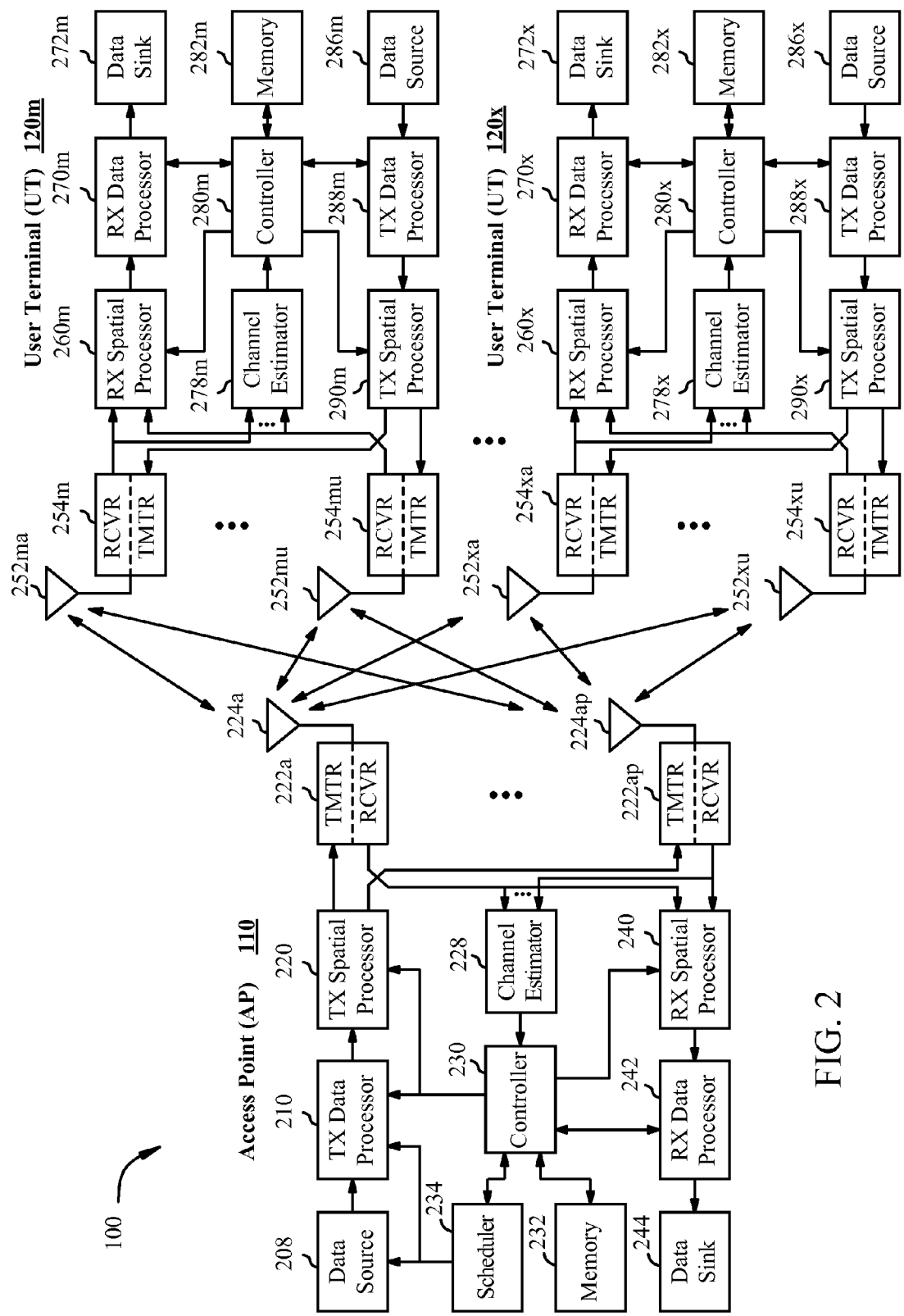
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$, user terminals are selected for simultaneous transmission on the uplink, $N_{dn}$ user terminals are selected for simultaneous transmission on the downlink, $N_{up}$, may or may not be equal to $N_{dn}$, and $N_{up}$, and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$, user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
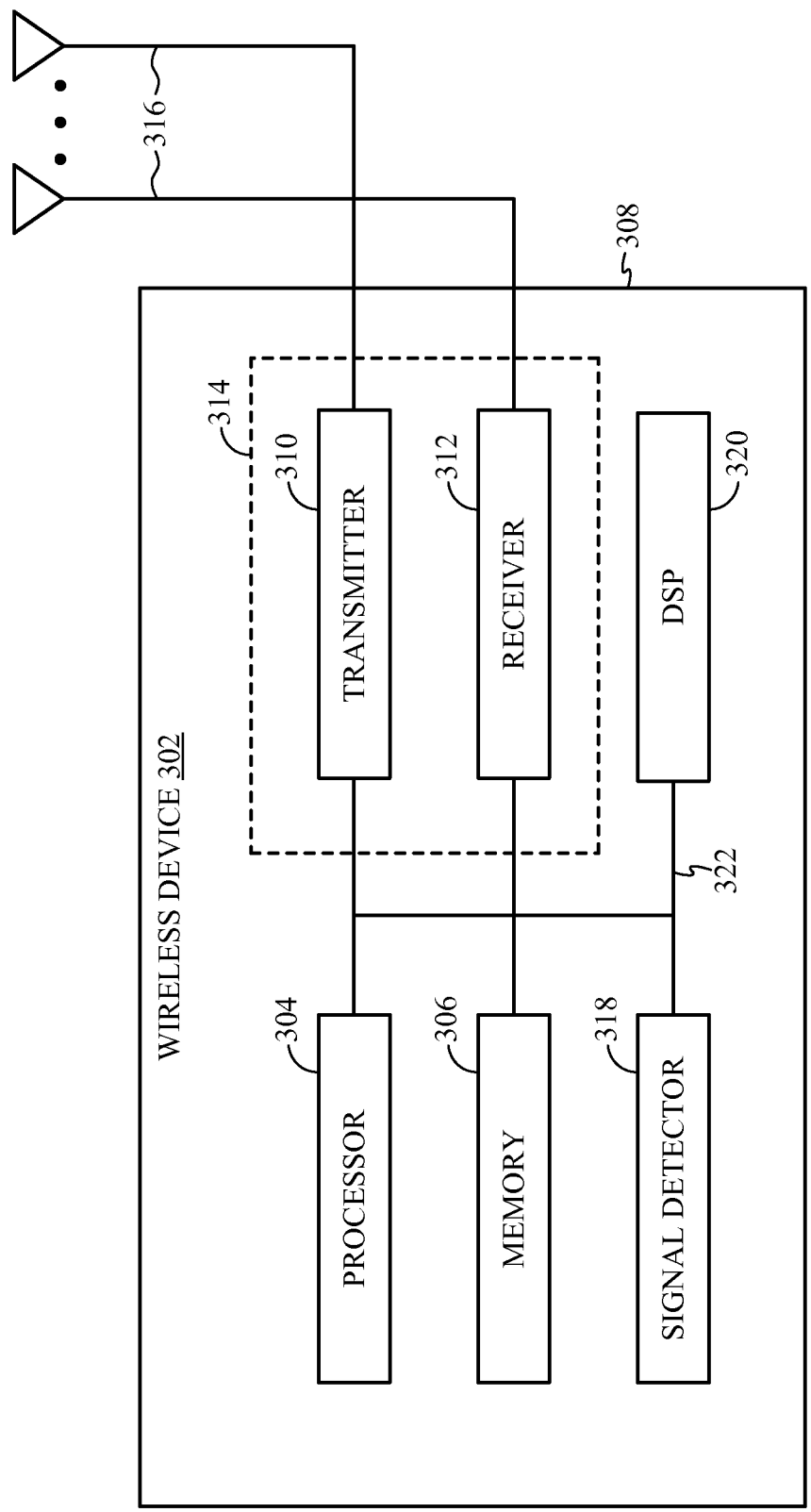
FIG. 3 illustrates a block diagram of an example wireless device in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

An Example Frame Structure

Figure 4:
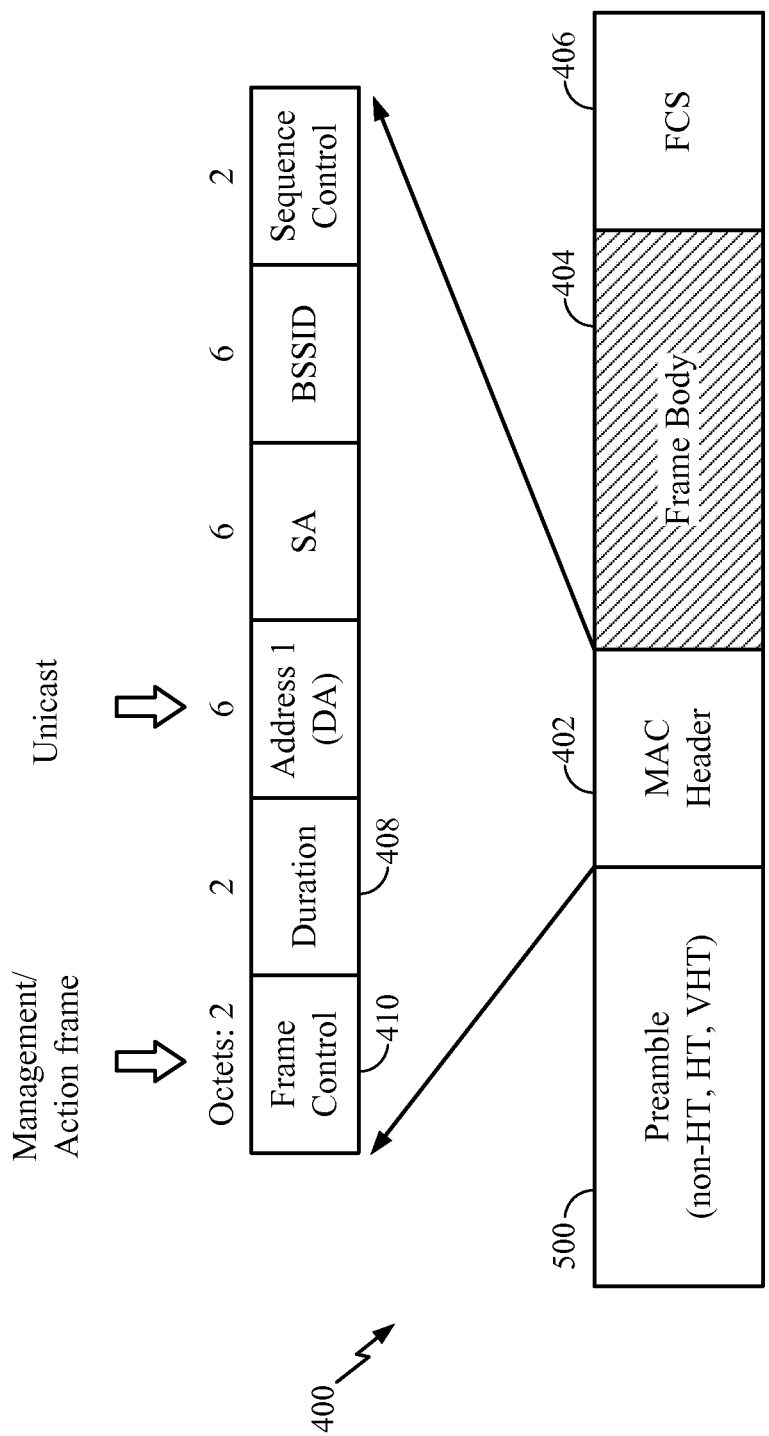
FIG. 4 illustrates an example frame structure for wireless communications in accordance with certain aspects of the present disclosure.

In order to communicate, the access point (AP) 110 and the user terminals 120 in a wireless network (e.g., system 100 illustrated in FIG. 1) may exchange messages according to certain frame structures. FIG. 4 illustrates an example frame structure 400 for wireless communications in accordance with certain aspects of the present disclosure. A short control frame, such as a Request to Send (RTS) or a Clear to Send (CTS) frame may comprise this frame structure. The frame structure 400 may comprise a preamble 500, a Media Access Control (MAC) header 402, a frame body 404, and a frame check sequence (FCS) 406.

Figure 5:
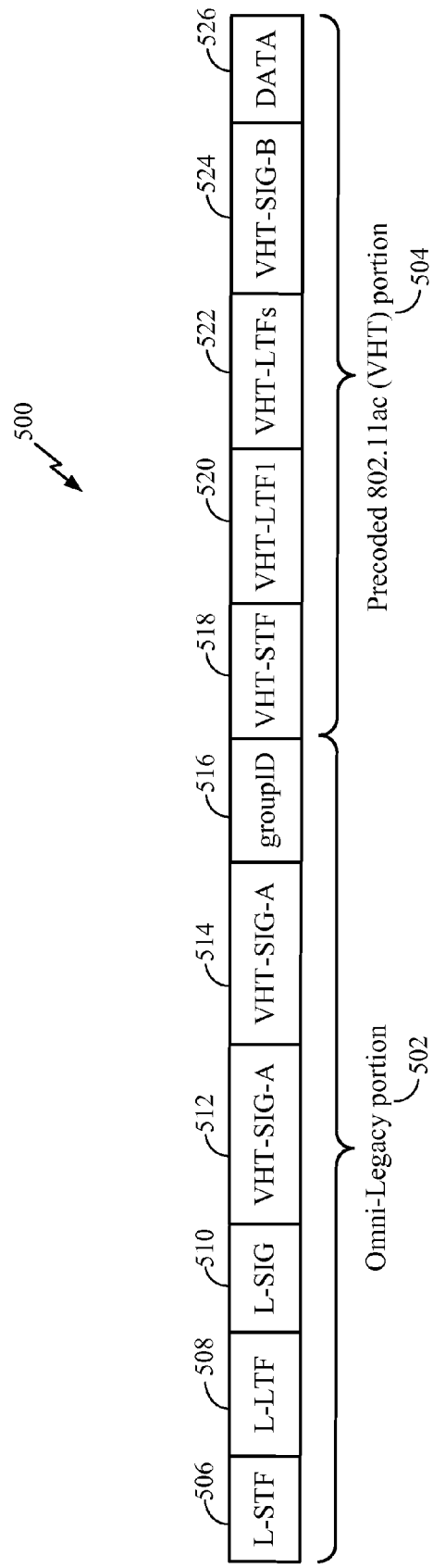
FIG. 5 illustrates an example preamble structure in accordance with certain aspects of the present disclosure.

FIG. 5 illustrates an example structure of a preamble 500 in accordance with certain aspects of the present disclosure. The preamble 500 may comprise an omni-legacy portion 502 (i.e., the non-beamformed portion) and a precoded 802.11ac VHT (Very High Throughput) portion 504. The legacy portion 502 may comprise a Legacy Short Training Field (L-STF) 506, a Legacy Long Training Field 508, a Legacy Signal (L-SIG) field 510, and two OFDM symbols in two VHT Signal A (VHT-SIG-A) fields 512, 514. For certain aspects, the legacy portion 502 may also comprise a group identifier (ID) field 516 to convey to all supported STAs that a particular set of STAs will be receiving spatial streams of a MU-MIMO transmission.

The precoded 802.11ac VHT portion 504 may comprise a VHT Short Training Field (VHT-STF) 518, a VHT Long Training Field 1 (VHT-LTF1) 520, VHT Long Training Fields (VHT-LTFs) 522, a VHT Signal B (VHT-SIG-B) field 524, and a data portion 526. The VHT-SIG-B field 524 may comprise one OFDM symbol and may be transmitted precoded/beamformed.

Example RTS and CTS for Multichannel Operations

IEEE 802.11ac is an amendment to the IEEE 802.11 standard that enables higher throughput in 802.11 networks. The higher throughput is realized through several measures, such as the use of MU-MIMO (multiuser multiple input multiple output) and 80 MHz or 160 MHz channel bandwidth. 802.11ac is also referred to as Very High Throughput (VHT).

In 802.11ac networks, the basic channel unit is about 20 MHz wide. Each PPDU (physical layer conversion protocol (PLCP) protocol data unit) can span 20, 40, 80, or 160 MHz (i.e., one, two, four, or eight 20 MHz channels). Each transmitting entity is assigned a primary channel from the plurality of channels used for transmitting data. The transmission procedure consists of performing real and virtual carrier sensing on the primary channel and real carrier sensing on the other channels to determine the plurality of channels that can be used.

However, due to the wider PPDU bandwidths and higher likelihood of hidden nodes, there is a need for determining the free (i.e., available) channels around the receiver before determining the bandwidth of a PPDU. The resulting PPDU will span the lesser of the "free" bandwidth around the transmitting entity and the free bandwidth around the receiving entity.

Accordingly what is needed are techniques and apparatus for efficiently determining the free bandwidth around the receiver. Moreover, such bandwidth determinations would preferably allow for setting the Network Allocation Vector (NAV) counter for other STAs, reserving the wireless medium and protecting the transmission from hidden nodes.

Figure 6:
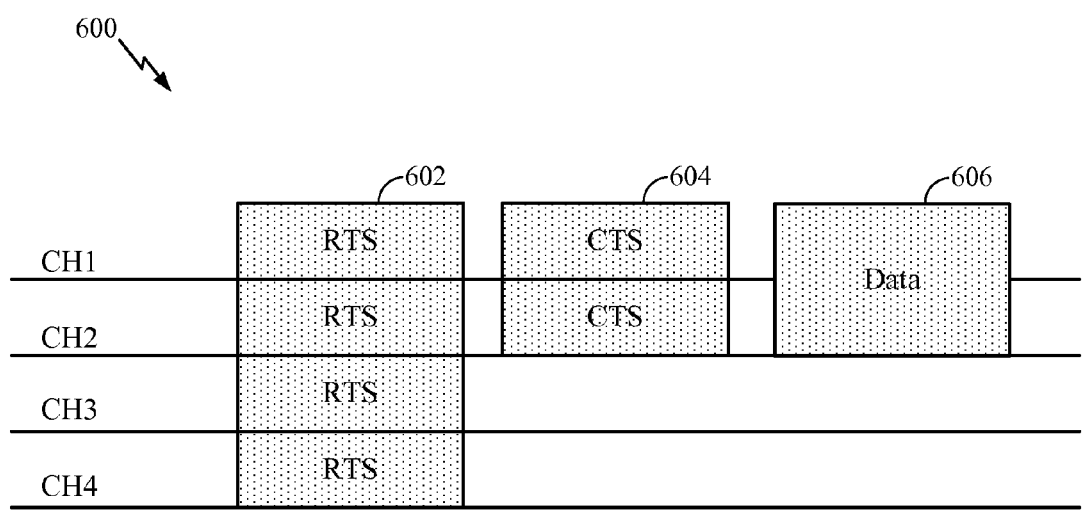
FIG. 6 illustrates an example of a single RTS/CTS frame exchange for bandwidth discovery, in accordance with certain aspects of the present disclosure.

FIG. 6 illustrates an example of a single RTS/CTS frame exchange 600 for bandwidth discovery, in accordance with certain aspects of the present disclosure. For an 80 MHz transmission according to the IEEE 802.11ac amendment, short control frames, such as Request to Send (RTS) frames 602, may be transmitted on four 20 MHz channels (CH1-CH4) from a transmitting entity (e.g., an AP 110) for sending data. In duplicate mode, the RTS frame 602 to be transmitted on the primary channel (e.g., CH1) may be copied and transmitted via the other channels (e.g., CH2-CH4) simultaneously with the RTS frame sent via the primary channel as shown.

A receiving entity (e.g., a user terminal 120) may determine the channels over which the RTS frames were sent and the channels determined to be available around the receiving entity. The receiving entity may then transmit short control frames, such as Clear to Send (CTS) frames 604, in response to the received RTS frames 602 on the available channels (e.g., CH1-CH2).

The transmitting entity may determine the channels over which the CTS frames 604 were sent. The transmitting entity may subsequently transmit data 606 over the available channels (the channels on which the CTS frames 604 were sent). As illustrated in FIG. 6, the bandwidth to be used for transmitting data may be 40 MHz (i.e., two 20 MHz channels) according to the IEEE 802.11ac amendment.

As a general overview, aspects of the present disclosure primarily address how to exchange available bandwidth (BW) information between a transmitter and a receiver. This exchange of bandwidth information may be performed implicitly—by determining the channels in which the RTS/CTS frames are actually sent—or explicitly. Explicit bandwidth information exchange may be accomplished by hiding information in a legacy (already existing according to the IEEE 802.11a/b/g amendments) frame format (referred to herein as a legacy RTS frame) or by defining a new frame format which carries a bandwidth information field (referred to herein as a VHT RTS frame).

Certain aspects of the present disclosure also address how to send the RTS/CTS frames so as to provide protection for the transmitter and the receiver. As described herein, protection generally refers to the RTS/CTS mechanism reserving the wireless medium for a time interval long enough to transmit a data frame and to receive the associated acknowledgement (ACK) frame.

Certain aspects may perform an RTS/CTS exchange using a legacy preamble and a legacy frame format. The RTS/CTS frames may carry the NAV information to cover the data transmission. This may most likely provide protection against legacy and VHT STAs. Such aspects may employ the implicit or the explicit bandwidth signaling mechanism.

Certain other aspects may perform an RTS/CTS exchange using a legacy or a VHT preamble and a VHT frame format including BW information. The RTS/CTS frames may carry the NAV information to cover the data transmission. This may most likely provide protection against legacy and VHT STAs. However, legacy STAs may be penalized due to the fact that the VHT RTS frame may not trigger the same behavior as a legacy RTS frame.

Certain other aspects may perform an RTS/CTS exchange using a legacy or a VHT preamble and a VHT frame format, which includes explicit BW information. RTS/CTS NAV may be set to cover only the RTS/CTS exchange. This initial RTS/CTS exchange may be followed with a subsequent RTS/CTS exchange using a legacy preamble and a legacy frame format. These legacy RTS/CTS frames may carry the NAV information to cover the data transmission. This may most likely provide protection against legacy and VHT STAs.

Certain other aspects may perform an initial RTS/CTS exchange using a legacy preamble and a legacy frame format followed by a subsequent RTS/CTS frame exchange with legacy or VHT preamble and a VHT frame format with explicit BW information.

Figure 7:
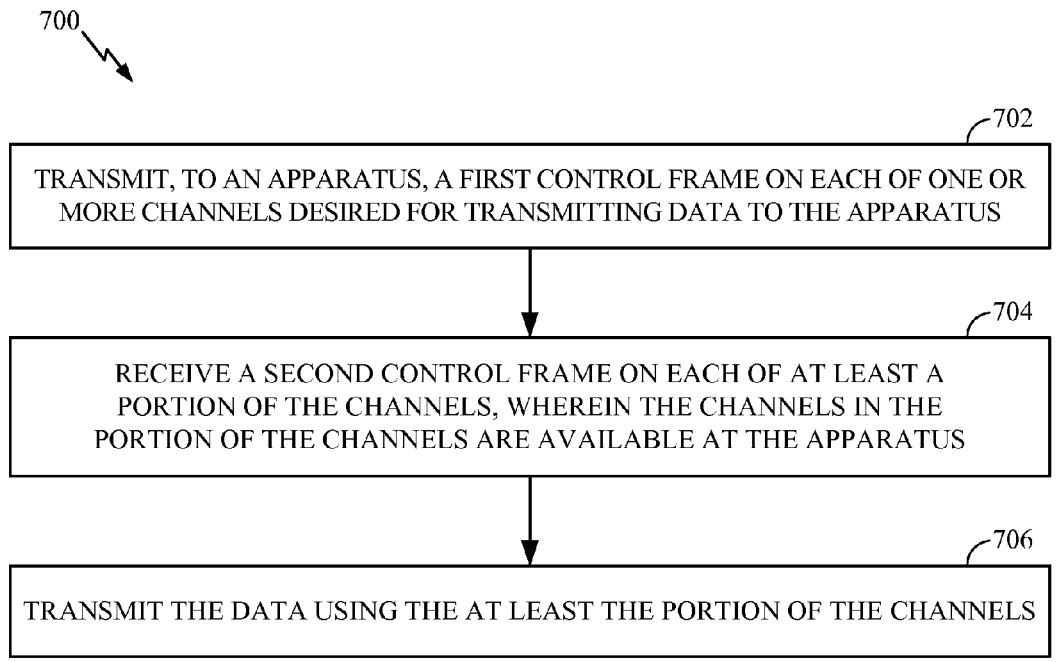
FIG. 7 illustrates example operations to implicitly exchange bandwidth information, from the perspective of a transmitting entity, according to the channels in which the control frames are actually sent, in accordance with certain aspects of the present disclosure.

FIG. 7 illustrates example operations 700 to implicitly exchange bandwidth information according to the channels in which the control frames are actually sent. The operations 700 may be performed by a transmitting entity, such as an AP 110. The operations 700 may begin, at 702, by transmitting, to an apparatus (e.g., the receiving entity), a first control frame on each of one or more channels desired for transmitting data to the apparatus. At 704, a second control frame may be received on each of at least a portion of the channels, wherein the channels in the portion of the channels are available at the apparatus. At 706, the transmitting entity may transmit the data using the at least the portion of the channels.

Figure 8:
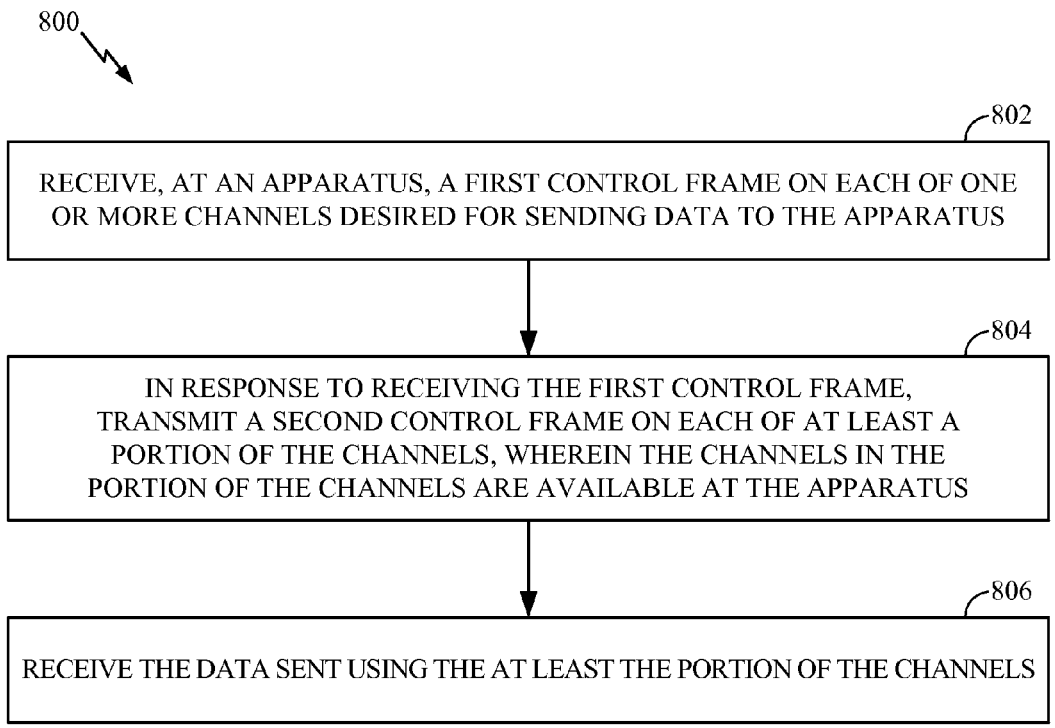
FIG. 8 illustrates example operations to implicitly exchange bandwidth information, from the perspective of a receiving entity, according to the channels in which the control frames are actually sent, in accordance with certain aspects of the present disclosure.
Figure 8A:
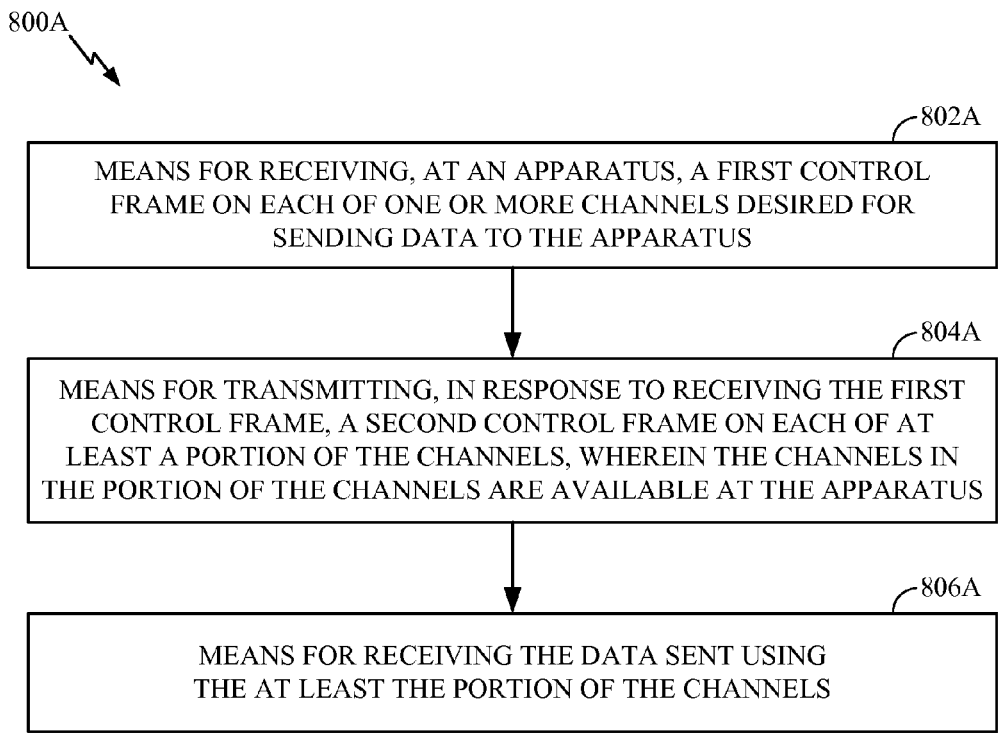
FIG. 8A illustrates example means for performing the operations shown in FIG. 8.

FIG. 8 illustrates example operations 800 to implicitly exchange bandwidth information according to the channels in which the control frames are actually sent. The operations 800 may be performed by a receiving entity, such as a user terminal 120. The operations 800 may begin, at 802, by receiving, at an apparatus (e.g., the receiving entity), a first control frame on each of one or more channels desired for sending data to the apparatus. At 804, in response to receiving the first control frame, the receiving entity may transmit a second control frame on each of at least a portion of the channels, wherein the channels in the portion of the channels are available at the apparatus. At 806, the receiving entity may receive the data sent using the at least the portion of the channels.

Method 1

A first method jointly addresses two aspects of the present disclosure: (1) the channels in which the RTS/CTS frames are sent implicitly represent the BW information and (2) define the protection level. This method may comprise utilizing the RTS and CTS frames sent using duplicate or copy mode. In other words, the RTS PPDU to be sent over the primary (20 MHz) channel is copied in all or some of the other 20 MHz channels that the transmitter intends to use for the transmission.

The RTS frame may be sent by using a preamble and frame format according to the IEEE 802.11a amendment (also referred to as a legacy RTS frame). Note that such an RTS frame does not carry any explicit indication of transmitted bandwidth. Rather, this method relies on the ability of the receiver to detect on which channels the (copies of the) RTS frames are sent.

The steps in this method may comprise:

Step 1: The transmitting entity (e.g., a transmitting station denoted "TxSTA") may send one or more RTS frames using duplicate mode over channels that are sensed to be free at the TxSTA. These free channels may represent channels desired for transmitting data (i.e., desired channels). Definition of free channels may include having the carrier sensing indicate that the wireless medium was idle for PIFS (point coordination function (PCF) interframe space) time before the transmission start. For example, the RTS frames 602 may be sent on CH1-CH4 as illustrated in FIG. 6.

Step 2: The receiving entity (e.g., a receiving station denoted "RxSTA") may receive the RTS frames and determine the channels over which the RTS frames were sent using any of various suitable techniques, such as multi-channel Short Training Field (STF) detection. Note that this detection does not use explicit signaling, but relies on signal detection capabilities at the physical (PHY) layer. Let "CH_RTS" denote the channels that are determined at the receiver to be the channels over which the RTS frames were received.

Step 3: RxSTA may send one or more CTS frames to TxSTA on a subset of CH_RTS that is determined to be free around RxSTA. For example, the CTS frames 604 may be sent on CH1-CH2 as illustrated in FIG. 6.

Step 4: TxSTA may receive the CTS frames sent by RxSTA and may determine the channels over which the CTS frames were sent. The TxSTA may then send data over the channels (e.g., CH1-CH2 as shown in FIG. 6) on which the CTS frames were sent. Note that the determination of the channels on which the CTS frames were received does not use an explicit signaling, but relies on signal detection capabilities at the PHY layer.

Figure 9:
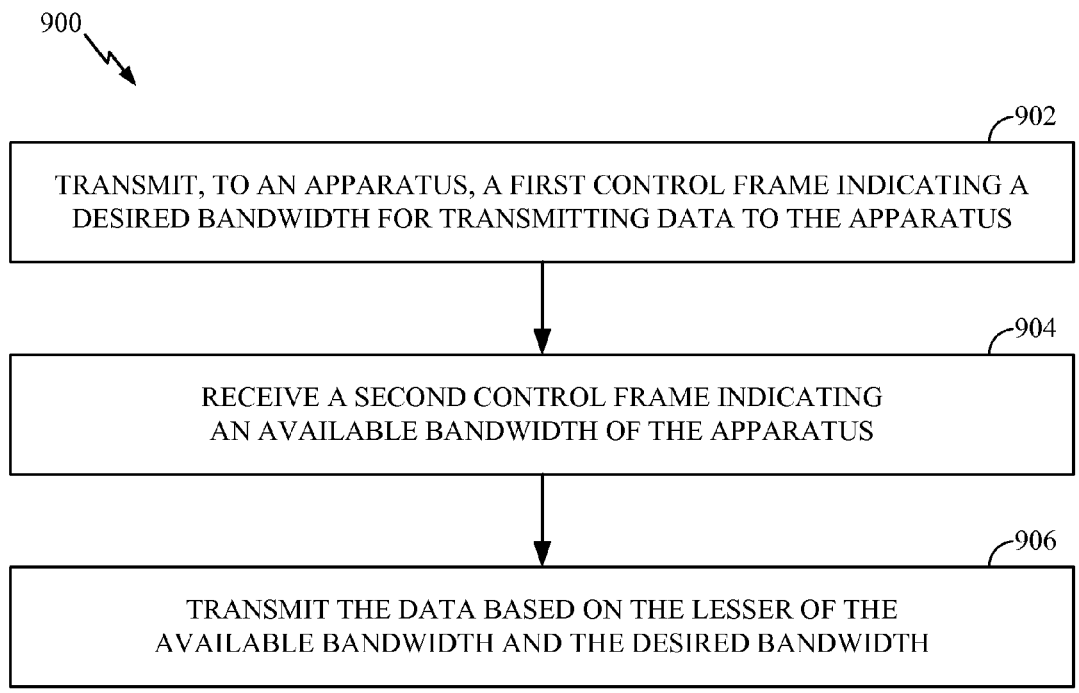
FIG. 9 illustrates example operations to explicitly exchange bandwidth information via control frames, from the perspective of a transmitting entity, in accordance with certain aspects of the present disclosure.
Figure 9A:
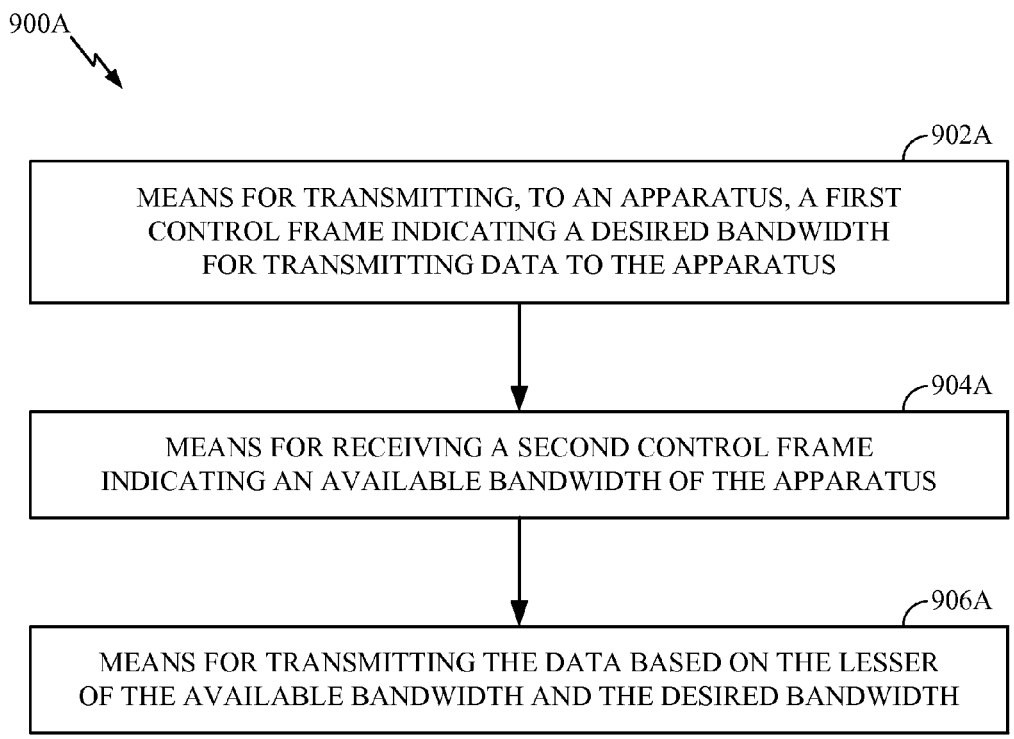
FIG. 9A illustrates example means for performing the operations shown in FIG. 9.

FIG. 9 illustrates example operations 900 to explicitly exchange bandwidth information via control frames. The operations 900 may be performed by a transmitting entity, such as an AP 110. The operations 900 may begin, at 902, by transmitting, to an apparatus (e.g., a receiving entity), a first control frame indicating a desired bandwidth for transmitting data to the apparatus. At 904, the transmitting entity may receive a second control frame indicating an available bandwidth of the apparatus. The transmitting entity may transmit the data, at 906, based on the lesser of the available bandwidth and the desired bandwidth.

Figure 10:
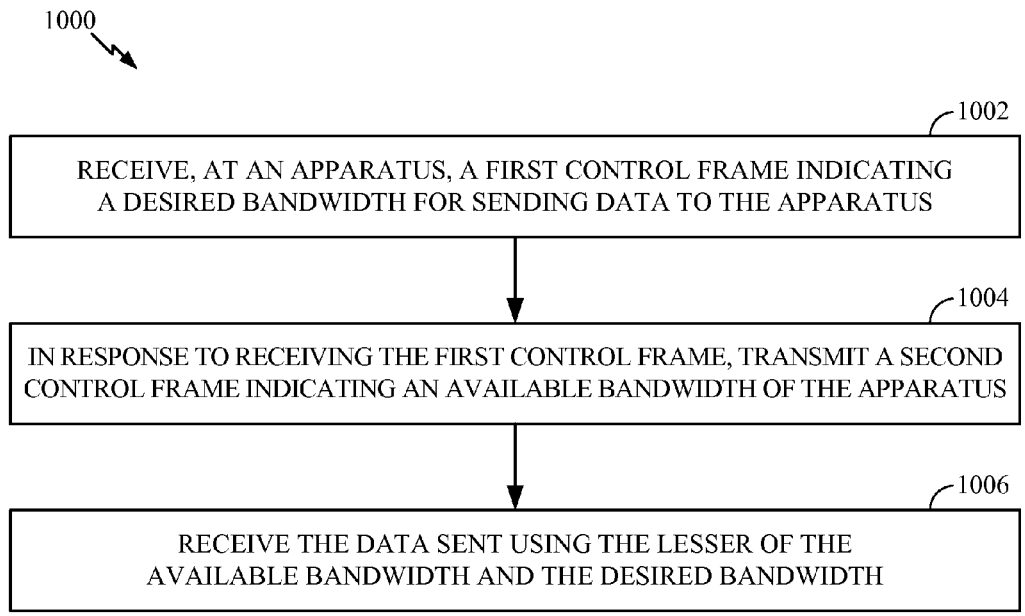
FIG. 10 illustrates example operations to explicitly exchange bandwidth information via control frames, from the perspective of a receiving entity, in accordance with certain aspects of the present disclosure.
Figure 10A:
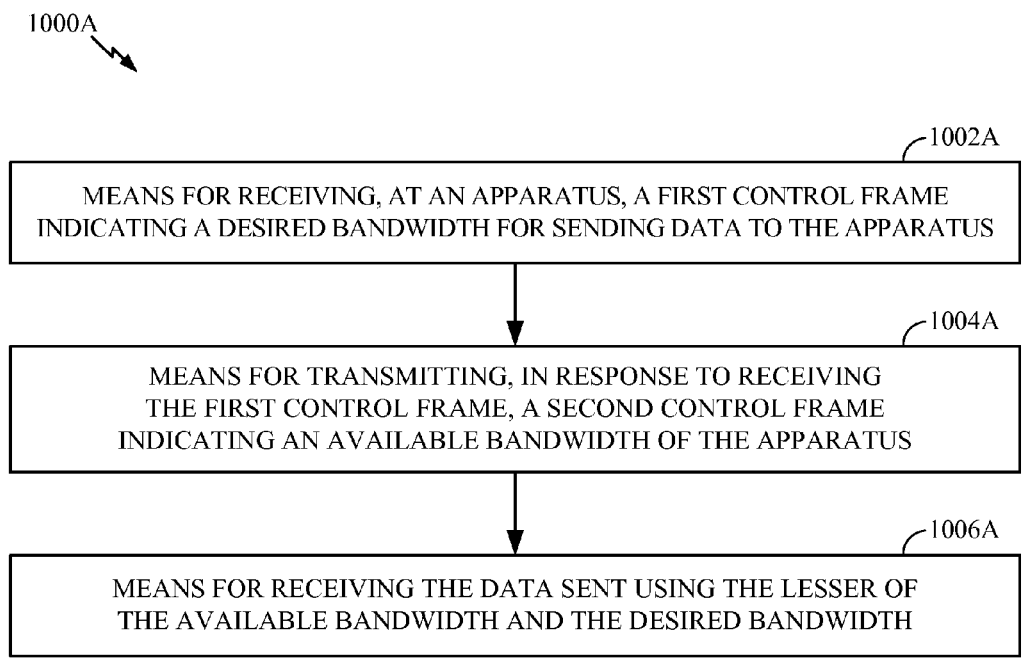
FIG. 10A illustrates example means for performing the operations shown in FIG. 10.

FIG. 10 illustrates example operations 1000 to explicitly exchange bandwidth information via control frames. The operations may be performed by a receiving entity, such as a user terminal 120. The operations 1000 may begin, at 1002, by receiving, at an apparatus (e.g., the receiving entity), a first control frame indicating a desired bandwidth for sending data to the apparatus. At 1004, in response to receiving the first control frame, the apparatus may transmit a second control frame indicating an available bandwidth to the apparatus. At 1006, the apparatus may receive the data sent using the lesser of the available bandwidth and the desired bandwidth.

Method 2

A second method addresses only the BW information exchange. Method 2 differs from Method 1 in that transmitted bandwidth information is included in the RTS/CTS frames that are sent using either a legacy or a VHT frame packet preamble. The main issue to be solved in method 2 is ensuring that the RTS/CTS frames that include the bandwidth information still function as valid RTS/CTS frames for legacy devices. Several techniques for accomplishing this are described below for Method 2.

Using the Duration Field of the RTS/CTS Frames (Version 1)

The idea with this first technique is to use bits, such as two or more of the least significant bits (LSBs), of the Duration field 408 of the MAC header 402 as a bandwidth indicator. In this manner, the bandwidth indication may be "hidden" in a legacy RTS or CTS frame. Two bits are sufficient to indicate the use of 20, 40, 80, 160 MHz bandwidths. Note that the Duration field 408 indicates time in microseconds (μs). For certain aspects, at least one most significant bit (MSB) of the Duration field 408 may indicate that the Duration field includes the bandwidth information.

Step 1: The transmitting entity may compute the transmission time T based on data to be transmitted, define T1=4*ceil (T/4), define T_RTS=T1+(LSBs to indicate BW), and set the Duration field of the transmitted RTS frame to T_RTS.

Step 2: A VHT-capable STA which is the intended recipient of the RTS frame may determine the desired reservation end time based on T1, which is obtained from T_RTS (in the Duration field 408 of the RTS) by first setting the LSBs to zero. A legacy STA—or a VHT STA which is not the intended recipient of the RTS frame—may simply set the reserved time to T_RTS.

Step 3: A VHT-capable RxSTA may compute the Duration field for the CTS (defined as T_CTS) as follows: T_CTS=T1+ (LSBs to indicate the available BW at the RxSTA).

Step 4: TxSTA may receive a CTS frame from RxSTA and use the LSBs of the Duration field to determine the bandwidth available to be used.

Using the Duration Field of the RTS/CTS (Version 2)

This second technique may use the same scheme as Version 1, with certain modifications described below. Note that a CTS frame might slightly extend the NAV that is set by the RTS. To avoid this problem, the Duration field may be "pre-"increased by 4 μs to build in sufficient margin.

Step 1: The transmitting entity may compute the transmission time T based on data to be transmitted, define T1=4*(1+ ceil(T/4)), define T_RTS=T1+(LSBs to indicate BW), and set the Duration field 408 of the RTS to be transmitted to T_RTS.

Step 2: Same as step 2 of Version 1.

Step 3: A VHT-capable RxSTA may compute the Duration field for the CTS frame (defined as T_CTS) according to T_CTS=T1−(LSBs to indicate the available BW at the RxSTA).

Step 4: Same as step 4 of Version 1.

Using the L-SIG Field

For certain aspects, the RTS/CTS frames may comprise a legacy preamble. This legacy preamble may have a legacy signal (L-SIG) field 510, and a bit of the L-SIG field may be used to indicate whether the RTS/CTS frame includes the bandwidth information. For certain aspects, at least one of an in-phase (I) component or a quadrature (Q) component of the L-SIG field may indicate whether the RTS or CTS frame includes the bandwidth information.

Use of the L-SIG field may be combined with other techniques disclosed in Method 2. For example, two LSBs of the Duration field 408 may indicate the bandwidth information in a legacy RTS/CTS frame, while one bit of the L-SIG field may indicate that the Duration field includes the bandwidth information.

Using the Service field bits

For certain aspects, Service field bits may be used as a bandwidth indication. Used for scrambler initialization, the Service field may comprise the first portion (e.g., the first 16 bits) of the Data field (the data portion 526). As one option, any two of the 9 reserved Service bits (according to the IEEE 802.11a amendment) may be used to indicate the bandwidth. For certain aspects, one additional bit for parity may also be included.

As a second option, the scrambler initialization seed may be used to indicate the bandwidth. For certain aspects utilizing this second option, scrambler seeds may be defined for each bandwidth. For example, four total scrambler seeds may be defined for 20, 40, 80, and 160 MHz. For other aspects, the TxSTA of each Basic Service Set (BSS) may define the bits to be used in the scrambler for each bandwidth.

A legacy receiver STA would not be affected. A VHT-capable STA, receiving the RTS, may check the transmitter address of the RTS. If the RTS is sent by a VHT STA, the receiver STA may use the information in the scrambler field to determine the BW. If the RTS is sent by a legacy STA, the receiver STA may deem that no BW information was sent.

Using Frame Control Bits

For certain aspects, bits in the Frame Control field 410 of the MAC header 402 of an RTS/CTS frame may be used as a bandwidth indication. Currently there are 7 "useless" bits, all set to 0. For certain aspects, one of the Frame Control bits may be used to indicate that the RTS/CTS frame is a new type of RTS/CTS frame with bandwidth information, and two or more other bits may be used to indicate the bandwidth information.

Using NAV Bits

For certain aspects, two or more bits (e.g., 2 LSBs) of the NAV may be used as a bandwidth indication. A VHT STA receiving an RTS frame may be informed that the RTS frame was sent by a VHT STA. Such notice may be provided using the sender's address, which may indicate the type of STA (i.e., legacy versus VHT STA).

In addition to the techniques described above, other techniques may be employed for exchanging bandwidth information included in the RTS/CTS frames. For certain aspects, bits in a physical layer (PHY) legacy preamble may be reused to indicate the bandwidth information. However, this may have an adverse affect on legacy STAs.

Method 3

A third method involves using an updated 802.11ac preamble. This method jointly addresses the BW information exchange and the frame exchange for medium reservation.

Step 1: TxSTA may send an RTS frame with a VHT (802.11ac) preamble using duplicate mode for the data portion of the RTS PPDU. In order to signal the duplicate mode of operation, one of the currently reserved bits of the VHT-SIG-A field 512 may be re-labeled to denote duplicate mode. This duplicate mode bit may be set to "1," and the channel bandwidth bits may denote the bandwidth over which the RTS frame is sent.

Step 2: RxSTA may receive the RTS frame and determine the channels over which the RTS was sent by using a combination of the duplicate mode bit and the channel bandwidth indicator in the RTS frame. CH_RTS may denote the channels that are determined at the receiver to be the channels over which the RTS was received.

Step 3: RxSTA may send a CTS frame to TxSTA on a subset of CH_RTS that is determined to be free around RxSTA. The VHT-SIG-A duplicate mode bit may be set if more than one 20 MHz channel is used, and the channel bandwidth bits may indicate the bandwidth over which the CTS is sent.

Step 4: TxSTA may receive the CTS frame sent by RxSTA. TxSTA may determine the channels over which the CTS was sent (using information from VHT-SIG-A) and send data over the channels on which the CTS was sent.

Method 4

A fourth method addresses the BW information exchange only. In Method 4, a new format of RTS frame (referred to as VHT-RTS) may be defined. Note that this refers to the frame format and not to the PHY preamble. The preamble may be a legacy preamble or a VHT preamble. When sent with a legacy preamble, legacy STAs may most likely be able to decode the signal, but the VHT-RTS frame will not look like an RTS frame to them. Legacy STAs will simply set the Network Allocation Vector (NAV) according to the Duration field 408. The Duration field in the VHT-RTS frame may indicate a NAV covering enough time for reception of the CTS frame, a short interframe space (SIFS), and subsequent transmission of the data.

The VHT-RTS frame format may contain a new field with an explicit indication of the BW. Similarly, a new frame format for CTS (referred to as VHT-CTS) may be defined, including a field which indicates the BW. The new RTS/CTS frames may be a new control frame or may use a control wrapper.

Method 5

In this fifth method, the RTS/CTS frame may comprise a High Throughput Control (HTC) field having a certain number of bits. For certain aspects, two or more bits of the HTC field may indicate the desired bandwidth.

Method 6

Figure 11:
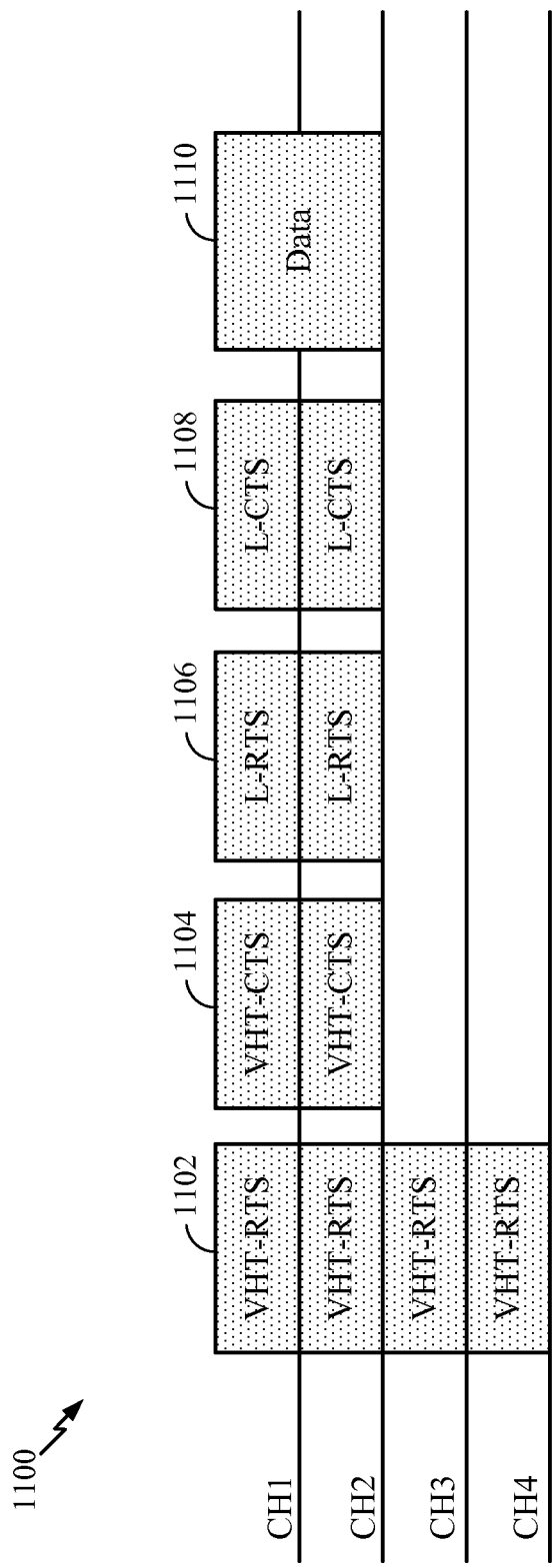
FIG. 11 illustrates an example of a double RTS/CTS exchange for bandwidth discovery, in accordance with certain aspects of the present disclosure.

A sixth method addresses the frame exchange for protection. In Method 6, VHT RTS/CTS frames containing explicit BW information may be exchanged in order to discover the available BW. The NAV set by the VHT RTS/CTS may cover only the RTS/CTS exchange, not the data exchange. FIG. 11 illustrates an example of a double RTS/CTS exchange 1100 for bandwidth discovery, in accordance with Method 6.

First, TxSTA may send one or more VHT-RTS frames 1102 with legacy duplicate or VHT preambles on known free channels (e.g., CH1-CH4 as illustrated in FIG. 11). Second, RxSTA may send one or more VHT-CTS frames 1104 with legacy duplicate or VHT preambles on known free channels among the channels indicated by the VHT-RTS frames 1102 (e.g., CH1-CH2 as illustrated in FIG. 11).

Following the previous exchange, legacy RTS/CTS frames may be exchanged. In other words, TxSTA may send one or more legacy RTS (L-RTS) frames 1106 with legacy preambles in duplicate mode on the channels indicated by the VHT-CTS frames 1104 using copy mode. Then, RxSTA may send legacy CTS (L-CTS) frames 1108 with legacy preambles duplicated on the free channels indicated previously by the VHT-CTS frames 1104. After receiving the legacy CTS frames 1108, TxSTA may send data 1110 on the channels indicated by the VHT-CTS frames 1104.

As mentioned above, the NAV set by the VHT-RTS/CTS frames may cover only the RTS/CTS exchange, not the data exchange. For example, the Duration field 408 in the VHT-RTS frame 1102 may indicate a NAV covering enough time for reception of the VHT-CTS frame 1104, a short interframe space (SIFS), and subsequent transmission of a legacy RTS frame 1106 for certain aspects. For other aspects, the Duration field 408 in the VHT-RTS frame 1102 may indicate a NAV covering enough time for reception of the VHT-CTS frame 1104, a first SIFS, subsequent transmission of a legacy RTS frame 1106, a second SIFS, and reception of a legacy CTS frame 1108.

In contrast, the NAV set by the legacy RTS/CTS mechanism may cover the data exchange. For example, the Duration field 408 in the L-RTS frame 1106 may indicate a NAV covering enough time for reception of the L-CTS frame 1108, a short interframe space (SIFS), and subsequent transmission of the data 1110. In this manner, the NAV set by the legacy RTS and legacy CTS frames protects the transmission of the data.

Method 7

Similar to Method 6 described above, Method 7 also involves a double RTS/CTS exchange for bandwidth discovery using explicit bandwidth information. However, Method 7 entails exchanging legacy RTS/CTS frames before exchanging VHT-RTS/CTS frames.

More specifically, TxSTA may send a legacy RTS frame on the primary channel (or on all the channels in copy mode). RxSTA may receive the legacy RTS frame and send a legacy CTS frame on all the channels that are idle. Since no explicit information is carried by these frames, the BW determination may not be available (unless performed implicitly as described above for Method 1). The previous exchange may be followed by TxSTA sending a VHT-RTS frame with a VHT or a legacy preamble using copy mode on free channels. The VHT-RTS frame may indicate free channels at the transmitting entity side. RxSTA may send a VHT-CTS frame with a legacy or a VHT preamble using copy mode on the available channels. The VHT-CTS frame may indicate the free channels at the receiving entity side. Subsequently, TxSTA may send data on channels indicated by the VHT-CTS frame.

Method 8

Figure 12:
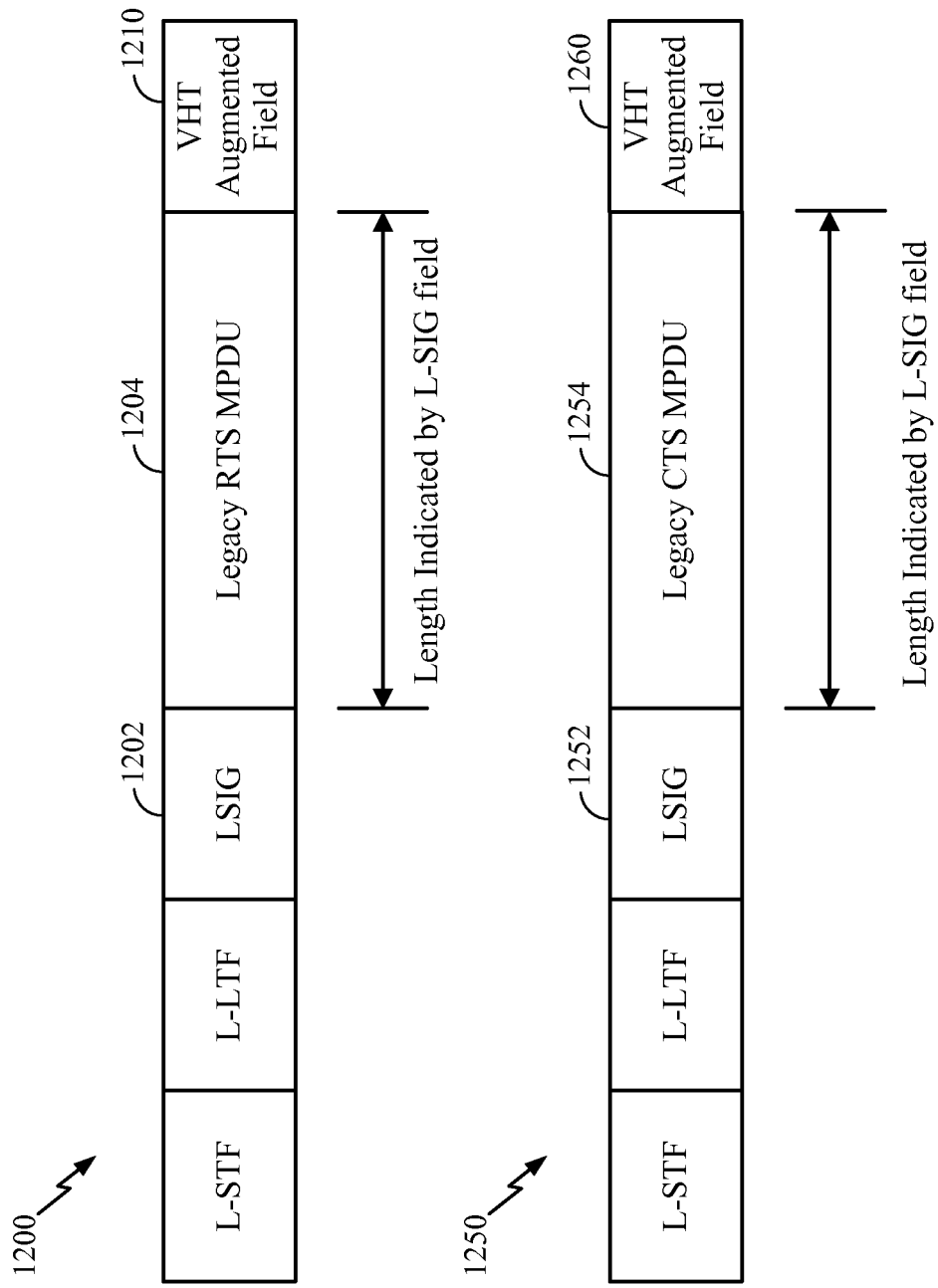
FIG. 12 illustrates indicating bandwidth information via an extension of a legacy RTS frame and a legacy CTS frame, in accordance with certain aspects of the present disclosure.

Method 8 may involve indicating bandwidth information explicitly via an extension of the legacy RTS/CTS frames. As illustrated in FIG. 12, a VHT-RTS frame 1200 (or a VHT-CTS frame 1250) may comprise a legacy RTS frame (or a legacy CTS frame) and one extra piggy-backed symbol called the VHT Augmented Field (VAF) 1210 (or 1260). The duration indicated by the L-SIG field 1202 (or 1252) may only cover the RTS Media Access Control (MAC) protocol data unit (MPDU) 1204 (or the CTS MPDU 1254) and not the VAF.

Method 8 may allow legacy nodes to decode the RTS/CTS messages and set NAV. However, VHT STAs may prepare to decode one extra symbol if the L-SIG length field indicates the length of an RTS frame (20 bytes) or of a CTS frame (14 bytes). VHT STAs may most likely be capable of responding to an RTS in less than the SIFS (short interframe space), so only 12 μs budget may be allowed for the VAF 1210, 1260.

The VAF may be transmitted with various data rate options. For certain aspects, the VAF may be sent at the lowest rate. For other aspects, the VAF may be sent at the same data rate as the preceding MPDU, which may provide a decoding advantage. For certain aspects, the VAF may be sent in "copy" mode like the RTS/CTS MPDU.

Only 24 bits of the VAF 1210, 1260 may be valid. The VAF may be designed to exactly fit one symbol at 6 Mb/s. Other bits may be set to padding or to a fixed pattern. For certain aspects, the VAF 1210, 1260 may contain at least an 8-bit Cyclic Redundancy Check (CRC) and 6 tail bits. An 8-bit CRC may enable robust detection. With a 24-bit VAF, 10 information bits may be available for indicating the bandwidth.

For certain aspects, even if the VAF of a VHT-RTS frame 1200 is not detected, the destination VHT-capable STA may send a VHT-CTS frame 1250 on the primary channel, for example.

Method 9

A ninth method jointly addresses the BW information exchange and the frame exchange for protection. Method 9 may involve the following steps:

Step 1: TxSTA may send a VHT-RTS frame using a VHT preamble without duplicate mode on only the primary channel (i.e., with 20 MHz bandwidth) and receive a VHT-CTS frame.

Step 2: TxSTA may send VHT-RTS frames with progressively increasing bandwidth (e.g., 40 MHz and then 80 MHz, using two and then four channels, respectively).

Step 3: If a VHT-CTS frame is received in response to Step 2 above indicating a lower bandwidth than the VHT-RTS frame, then TxSTA may stop sending VHT-RTS and send data according to the bandwidth indicated by the received VHT-CTS frame. If a VHT-CTS frame is not received in response to Step 2, then TxSTA may use PIFS continuation to send data on the known available channels. For example, if a VHT-CTS frame is not received in response to a VHT-RTS frame for higher bandwidths in Step 2, then TxSTA may transmit data at the highest bandwidth of the VHT-CTS frames received thus far.

Figure 13:
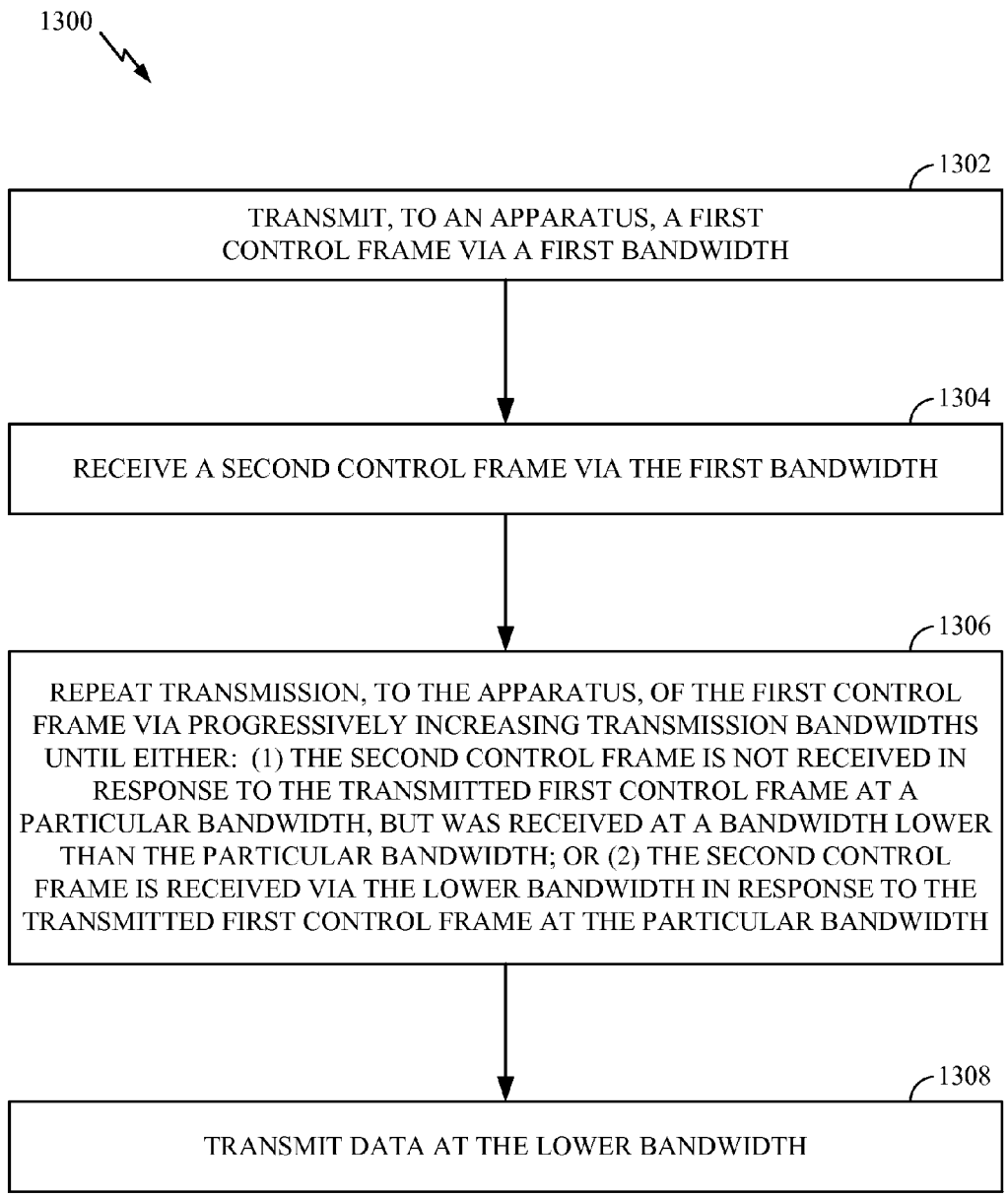
FIG. 13 illustrates example operations to exchange bandwidth information via control frames using progressively increasing transmission bandwidths, from the perspective of a transmitting entity, in accordance with certain aspects of the present disclosure.
Figure 13A:
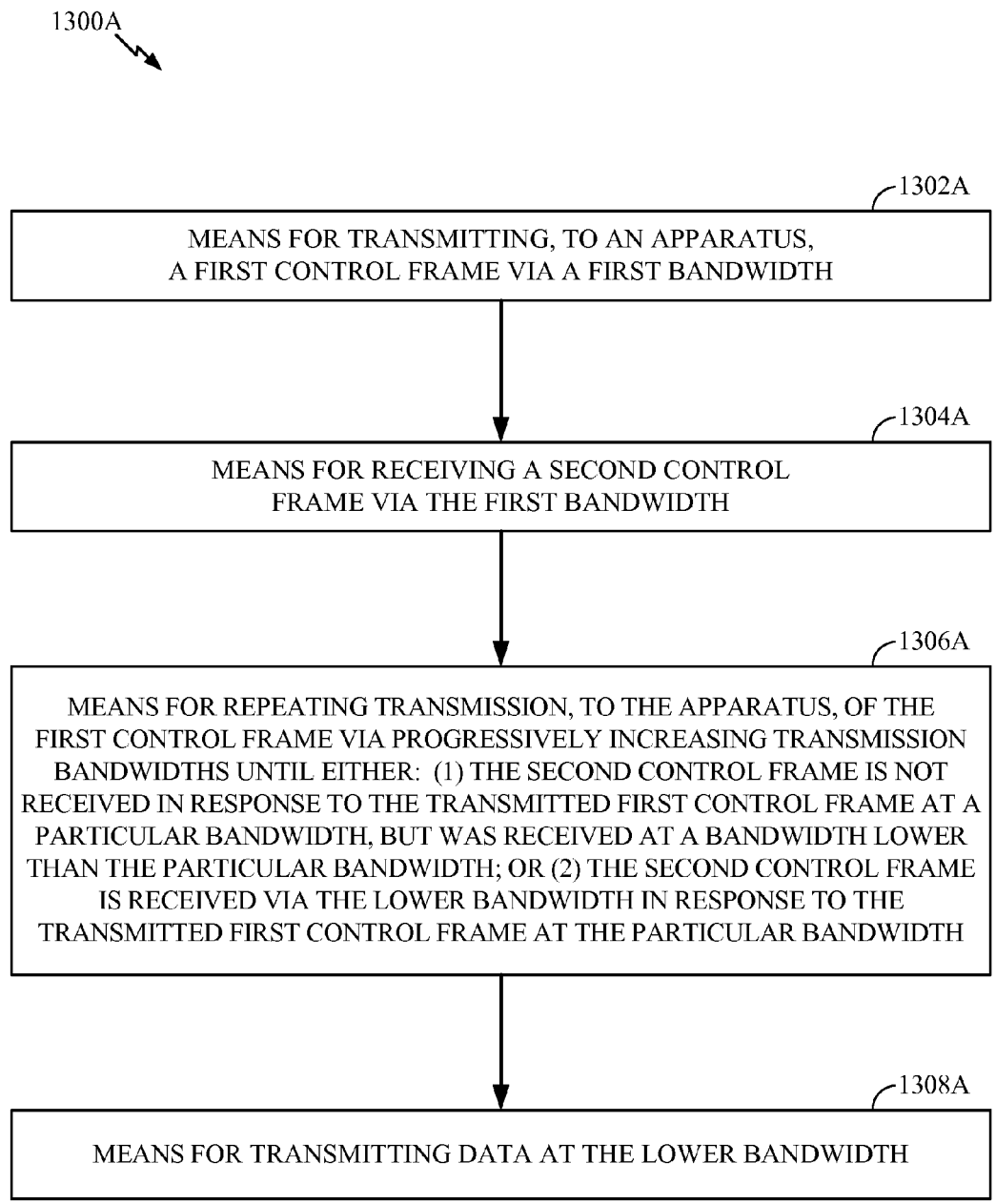
FIG. 13A illustrates example means for performing the operations shown in FIG. 13.

FIG. 13 illustrates example operations 1300 to exchange bandwidth information via control frames using progressively increasing transmission bandwidths in accordance with Method 9. The operations 1300 may be performed by a transmitting entity (e.g., an access point 110). The operations 1300 may begin, at 1302, by transmitting, to an apparatus (e.g., a receiving entity, such as a user terminal 120), a first control frame via a first bandwidth. At 1304, the transmitting entity may receive a second control frame via the first bandwidth. At 1306, the transmitting entity may repeat transmission, to the apparatus, of the first control frame via progressively increasing transmission bandwidths. The transmission may be repeated until either: (1) the second control frame is not received in response to the transmitted first control frame at a particular bandwidth, but was received at a bandwidth lower than the particular bandwidth; or (2) the second control frame is received via the lower bandwidth in response to the transmitted first control frame at the particular bandwidth. At 1308, the transmitting entity may transmit data, to the apparatus, at the lower bandwidth.

For certain aspects that send explicit BW information, the BW information may be transmitted in the NAV or the Frame Control fields 410 of the RTS/CTS frames. The receiving entity may check that the transmit address of the RTS frame corresponds to a multichannel-capable STA or other entity (i.e., a VHT device supporting 802.11ac, 802.11af, or later amendments) before determining the explicit BW information. For certain aspects, the check that an RTS/CTS frame has been sent by a multichannel-capable device may be based on a table lookup. For other aspects, the check that an RTS/CTS frame has been sent by a multichannel-capable entity may be based on the address belonging to a set of—or being in a range of—addresses that are allocated by a standardization body, for example.

Figure 14:
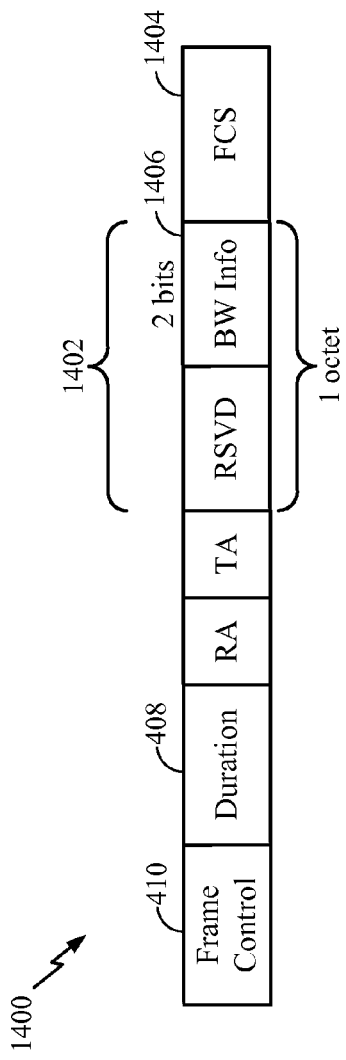
FIG. 14 illustrates an example RTS frame structure with explicit bandwidth information, in accordance with certain aspects of the present disclosure.

As illustrated in FIG. 14, explicit BW information may be provided in an RTS frame 1400. According to certain aspects, the RTS frame 1400 may be based on the legacy RTS, but with a few differences. A field 1402 comprising one extra byte (1 octet) may be included in the RTS frame and located before the FCS field 1404. The extra byte field 1402 may comprise, for example, a 2-bit BW indication (denoted as the "BW Info" field 1406. Other bits of this field 1402 may be reserved (denoted as "RSVD") for future optional features. According to certain aspects, this frame 1400 may be a new control frame defined by using the subtype extension as in the IEEE 802.11ad amendment. As an example, the control frame may be defined using type Control (01) and subtype Control frame extension (0110) according to 802.11ad, extended subtype 1011. As another example, the control frame may be defined using type Extension (11) and subtype VHT-RTS (0001).

Figure 15:
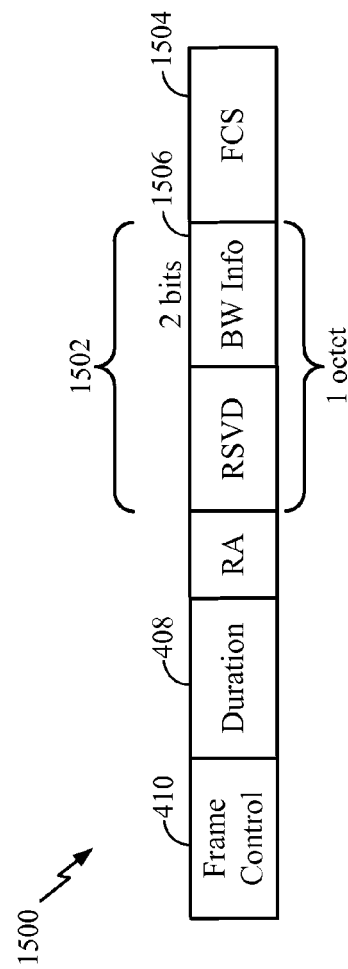
FIG. 15 illustrates an example CTS frame structure with explicit bandwidth information, in accordance with certain aspects of the present disclosure.

As illustrated in FIG. 15, explicit BW information may be provided in a CTS frame 1500. According to certain aspects, the CTS frame 1500 may based on the legacy CTS, but with a few differences. A field 1502 comprising one extra byte (8 bits) may be included in the CTS frame and located before the FCS field 1504. The extra byte field 1502 may comprise, for example, a 2-bit BW indication (denoted as the "BW Info" field 1506. Other bits of this field 1502 may be reserved (denoted as "RSVD") for future optional features. According to certain aspects, this frame 1500 may be a new control frame defined by using the subtype extension as in the IEEE 802.11ad amendment. As an example, the control frame may be defined using type Control (01) and subtype Control frame extension (0110) according to 802.11ad, extended subtype 1100. As another example, the control frame may be defined using type Extension (11) and subtype VHT-CTS (0010).

The methods and apparatus described above provide various options for signaling the bandwidth to be used for wireless communications using an RTS/CTS exchange, providing for bandwidths of at least 20 MHz, 40 MHz, 80 MHz, 160 MHz, or higher. In addition to this bandwidth information exchange, aspects of the present disclosure may also allow for NAV protection in multiple channels.

Figure 7A:
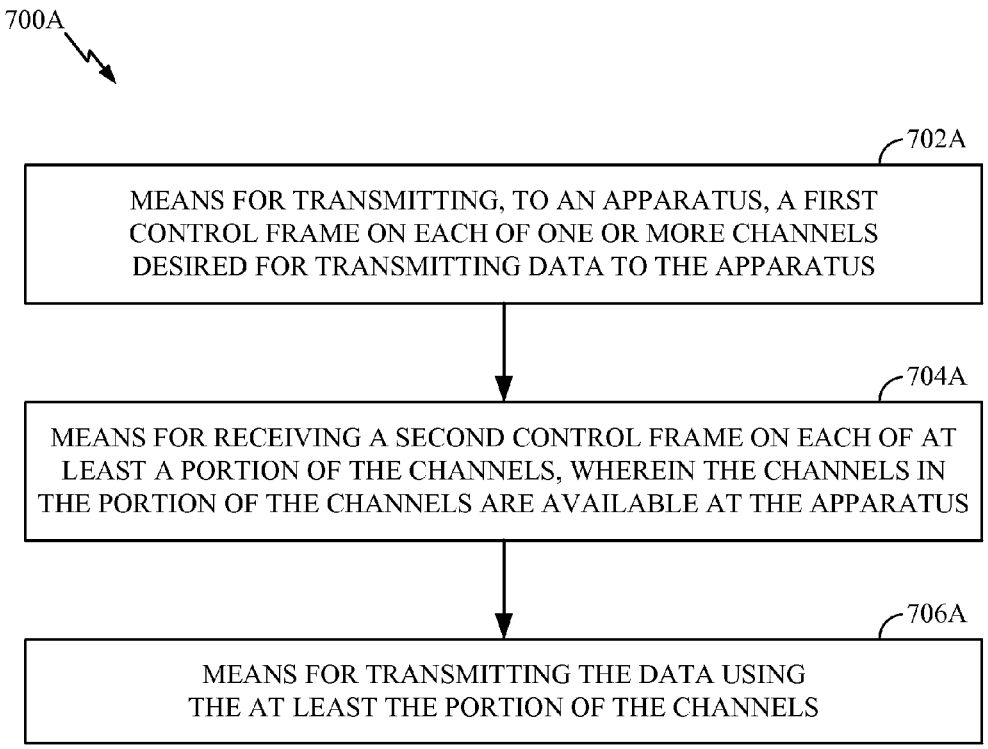
FIG. 7A illustrates example means for performing the operations shown in FIG. 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7 correspond to means 700A illustrated in FIG. 7A.

For example, means for transmitting the first control frame and/or the data may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for checking an address of a received RTS frame and/or means for determining desired channels may comprise a processing system, which may include one or more processors, such as the RX data processor 270 and/or the controller 280 of the user terminal 120 or the RX data processor 242 and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communications, comprising:
transmitting, to an apparatus, a first control frame indicating a desired bandwidth for transmitting data to the apparatus;
receiving a second control frame indicating an available bandwidth of the apparatus;
determining a bandwidth for transmitting the data to the apparatus based on the lesser of the available bandwidth and the desired bandwidth; and transmitting the data according to the determined bandwidth, wherein the first control frame comprises a Request to Send (RTS) frame, wherein the RTS frame comprises a Service field having a scrambler initialization seed, and wherein the scrambler initialization seed of the Service field indicates the desired bandwidth.

2. The method of claim 1, wherein the first control frame comprises a Request to Send (RTS) frame and wherein the RTS frame comprises a legacy frame format according to the Institute of Electrical and Electronics Engineers (IEEE) 802.11a amendment to the IEEE 802.11 standard.

3. The method of claim 1, wherein the first control frame comprises a Request to Send (RTS) frame, wherein the RTS frame comprises a legacy frame format according to the Institute of Electrical and Electronics Engineers (IEEE) 802.11a amendment to the IEEE 802.11 standard, and wherein at least one of:
the RTS frame comprises a legacy preamble according to the IEEE 802.11a amendment,
wherein the legacy preamble comprises a legacy signal (L-SIG) field and wherein a bit of the L-SIG field indicates that the RTS frame indicates the desired bandwidth; or
the RTS frame comprises a Service field having two or more reserved bits according to the IEEE 802.11a amendment, wherein the reserved bits of the Service field indicate the desired Bandwidth.

4. The method of claim 3, wherein at least one of an in-phase (I) component or a quadrature (Q) component of the L-SIG field indicates that the RTS frame indicates the desired bandwidth.

5. The method of claim 1, wherein the first control frame comprises a Request to Send (RTS) frame, wherein the RTS frame comprises a duration field, and wherein two or more least significant bits (LSBs) of the duration field indicate the desired bandwidth.

6. The method of claim 5, wherein at least one most significant bit (MSB) of the duration field indicates that the RTS frame indicates the desired bandwidth.

7. The method of claim 1, wherein the first control frame comprises a Request to Send (RTS) frame, wherein the RTS frame comprises a frame control field, and wherein two or more bits of the frame control field indicate the desired bandwidth.

8. The method of claim 1, wherein the first control frame comprises a Request to Send (RTS) frame and wherein the RTS frame comprises:
   a preamble indicating whether a duplicate mode is used for a data portion of the RTS frame; and
   channel bandwidth bits indicating the desired bandwidth.

9. The method of claim 8, wherein the preamble comprises a Very High Throughput Signal A (VHT-SIG-A) field having reserved bits and wherein one of the reserved bits of the VHT-SIG-A field indicates the duplicate mode.

10. The method of claim 1, wherein the first control frame comprises a Request to Send (RTS) frame, wherein the RTS frame comprises a High Throughput Control (HTC) field, and wherein two or more bits of the HTC field indicate the desired bandwidth.

11. The method of claim 1, wherein the first control frame comprises a Request to Send (RTS) frame, wherein the second control frame comprises a Clear to Send (CTS) frame, and wherein the RTS frame comprises a duration field indicating a Network Allocation Vector (NAV) covering reception of the CTS frame, time for a short interframe space (SIPS), and transmission of the data.

12. The method of claim 1, wherein the first control frame comprises a Request to Send (RTS) frame and wherein the RTS frame comprises a frame format with a bandwidth information field indicating the desired bandwidth.

13. The method of claim 12, wherein the RTS frame comprises:
   the frame format with the bandwidth information field; and
   a legacy preamble according to the Institute of Electrical and Electronics Engineers (IEEE) 802.11 a amendment to the IEEE 802.11 standard or a preamble indicating whether a duplicate mode is used for a data portion of the RTS frame.

14. The method of claim 12, wherein transmitting the first control frame comprises transmitting the RTS frame, with the bandwidth information field, on each of one or more channels for transmitting the data to the apparatus according to the desired bandwidth and wherein receiving the second control frame comprises receiving a Clear to Send (CTS) frame on each of at least a portion of the channels according to the available bandwidth of the apparatus.

15. The method of claim 14, further comprising:
   transmitting, to the apparatus, a legacy RTS frame according to the Institute of Electrical and Electronics Engineers (IEEE) 802.11a amendment to the IEEE 802.11 standard, the legacy RTS frame being duplicated on each of the at least the portion of the channels; and
   receiving a legacy CTS frame according to the IEEE 802.11a amendment, the legacy CTS frame being duplicated on each of the at least the portion of the channels, wherein a first Network Allocation Vector (NAV) set by the legacy RTS and legacy CTS frames protects transmission of the data.

16. The method of claim 15, wherein the RTS frame comprises a duration field indicating a second Network Allocation Vector (NAV) covering reception of the CTS frame, time for a short interframe space (SIPS), and transmission of the legacy RTS frame.

17. The method of claim 12, further comprising:
   transmitting, to the apparatus, a legacy RTS frame according to the Institute of Electrical and Electronics Engineers (IEEE) 802.11a amendment to the IEEE 802.11 standard on a primary channel or duplicated on each of a first set of channels; and
   receiving a legacy a Clear to Send (CTS) frame according to the IEEE 802.11a amendment on at least a portion of the first set of channels, wherein the at least the portion of the first set of channels are idle at the apparatus, wherein transmitting the first control frame comprises, after receiving the legacy CTS frame, transmitting the RTS frame, with the bandwidth information field, on each of a second set of channels for transmitting the data to the apparatus according to the desired bandwidth, and wherein receiving the second control frame comprises receiving a CTS frame on each of at least a portion of the second set of channels according to the available bandwidth of the apparatus.

18. An apparatus for wireless communications, comprising:
   a transmitter configured to transmit, to another apparatus, a first control frame indicating a desired bandwidth for transmitting data to the other apparatus; and
   a receiver configured to receive a second control frame indicating an available bandwidth of the other apparatus; and
   a processor configured to determine a bandwidth for transmitting the data to the another apparatus based on the lesser of the available bandwidth and the desired bandwidth, wherein the transmitter is further configured to transmit the data at the determined bandwidth, wherein the first control frame comprises a Request to Send (RTS) frame, and wherein the RTS frame comprises a Service field having a scrambler initialization seed, and wherein the scrambler initialization seed of the Service field indicates the desired bandwidth.

19. The apparatus of claim 18, wherein the first control frame comprises a Request to Send (RTS) frame and wherein the RTS frame comprises a legacy frame format according to the Institute of Electrical and Electronics Engineers (IEEE) 802.11a amendment to the IEEE 802.11 standard.

20. The apparatus of claim 18, wherein the first control frame comprises a Request to Send (RTS) frame, wherein the RTS frame comprises a legacy frame format according to the Institute of Electrical and Electronics Engineers (IEEE) 802.11a amendment to the IEEE 802.11 standard, and wherein at least one of:
   the RTS frame comprises a legacy preamble according to the IEEE 802.11a amendment, wherein the legacy preamble comprises a legacy signal (L-SIG) field and wherein a bit of the L-SIG field indicates that the RTS frame indicates the desired bandwidth; or
   the RTS frame comprises a Service field having two or more reserved bits according to the IEEE 802.11a amendment, wherein the reserved bits of the Service field indicate the desired bandwidth.

21. The apparatus of claim 20, wherein at least one of an in-phase (I) component or a quadrature (Q) component of the L-SIG field indicates that the RTS frame indicates the desired bandwidth.

22. The apparatus of claim 18, wherein the first control frame comprises a Request to Send (RTS) frame, wherein the RTS frame comprises a duration field, and wherein two or more least significant bits (LSBs) of the duration field indicate the desired bandwidth.

23. The apparatus of claim 22, wherein at least one most significant bit (MSB) of the duration field indicates that the RTS frame indicates the desired bandwidth.

24. The apparatus of claim 18, wherein the first control frame comprises a Request to Send (RTS) frame, wherein the RTS frame comprises a frame control field, and wherein two or more bits of the frame control field indicate the desired bandwidth.

25. The apparatus of claim 18, wherein the first control frame comprises a Request to Send (RTS) frame and wherein the RTS frame comprises:
   a preamble indicating whether a duplicate mode is used for a data portion of the RTS frame; and
   channel bandwidth bits indicating the desired bandwidth.

26. The apparatus of claim 25, wherein the preamble comprises a Very High Throughput Signal A (VHT-SIG-A) field having reserved bits and wherein one of the reserved bits of the VHT-SIG-A field indicates the duplicate mode.

27. The apparatus of claim 18, wherein the first control frame comprises a Request to Send (RTS) frame, wherein the RTS frame comprises a High Throughput Control (HTC) field, and wherein two or more bits of the HTC field indicate the desired bandwidth.

28. The apparatus of claim 18, wherein the first control frame comprises a Request to Send (RTS) frame, wherein the second control frame comprises a Clear to Send (CTS) frame, and wherein the RTS frame comprises a duration field indicating a Network Allocation Vector (NAV) covering reception of the CTS frame, time for a short interframe space (SIPS), and transmission of the data.

29. The apparatus of claim 18, wherein the first control frame comprises a Request to Send (RTS) frame and wherein the RTS frame comprises a frame format with a bandwidth information field indicating the desired bandwidth.

30. The apparatus of claim 29, wherein the RTS frame comprises:
   the frame format with the bandwidth information field; and
   a legacy preamble according to the Institute of Electrical and Electronics Engineers (IEEE) 802.11 a amendment to the IEEE 802.11 standard or a preamble indicating whether a duplicate mode is used for a data portion of the RTS frame.

31. The apparatus of claim 29, wherein the transmitter is configured to transmit the first control frame by transmitting the RTS frame, with the bandwidth information field, on each of one or more channels for transmitting the data to the other apparatus according to the desired bandwidth and wherein the receiver is configured to receive the second control frame by receiving a Clear to Send (CTS) frame on each of at least a portion of the channels according to the available bandwidth of the other apparatus.

32. The apparatus of claim 31, wherein the transmitter is further configured to transmit, to the other apparatus, a legacy RTS frame according to the Institute of Electrical and Electronics Engineers (IEEE) 802.11a amendment to the IEEE 802.11 standard, the legacy RTS frame being duplicated on each of the at least the portion of the channels; and wherein the receiver is further configured to receive a legacy CTS frame according to the IEEE 802.11a amendment, the legacy CTS frame being duplicated on each of the at least the portion of the channels, wherein a first Network Allocation Vector (NAV) set by the legacy RTS and legacy CTS frames protects transmission of the data.

33. The apparatus of claim 32, wherein the RTS frame comprises a duration field indicating a second Network Allocation Vector (NAV) covering reception of the CTS frame, time for a short interframe space (SIPS), and transmission of the legacy RTS frame.

34. The apparatus of claim 29, wherein the transmitter is further configured to transmit, to the other apparatus, a legacy RTS frame according to the Institute of Electrical and Electronics Engineers (IEEE) 802.11a amendment to the IEEE 802.11 standard on a primary channel or duplicated on each of a first set of channels; wherein the receiver is further configured to receive a legacy Clear to Send (CTS) frame according to the IEEE 802.11a amendment on at least a portion of the first set of channels, wherein the at least the portion of the first set of channels are idle at the other apparatus; wherein the transmitter is further configured to transmit the first control frame by, after receiving the legacy CTS frame, transmitting the RTS frame, with the bandwidth information field, on each of a second set of channels for transmitting the data to the other apparatus according to the desired bandwidth; and wherein the receiver is further configured to receive the second control frame by receiving a CTS frame on each of at least a portion of the second set of channels according to the available bandwidth of the other apparatus.

35. An apparatus for wireless communications, comprising:
   means for transmitting, to another apparatus, a first control frame indicating a desired bandwidth for transmitting data to the other apparatus;
   means for receiving a second control frame indicating an available bandwidth of the other apparatus; and
   means for determining a bandwidth for transmitting the data to the apparatus based on the lesser of the available bandwidth and the desired bandwidth, wherein the means for transmitting is further configured to transmit the data at the determined bandwidth, wherein the first control frame comprises a Request to Send (RTS) frame, wherein the RTS frame comprises a Service field having a scrambler initialization seed, and wherein the scrambler initialization seed of the Service field indicates the desired bandwidth.

36. The apparatus of claim 35, wherein the first control frame comprises a Request to Send (RTS) frame and wherein the RTS frame comprises a legacy frame format according to the Institute of Electrical and Electronics Engineers (IEEE) 802.11a amendment to the IEEE 802.11 standard.

37. The apparatus of claim 35, wherein the first control frame comprises a Request to Send (RTS) frame, wherein the RTS frame comprises a legacy frame format according to the Institute of Electrical and Electronics Engineers (IEEE) 802.11a amendment to the IEEE 802.11 standard, and wherein at least one of:
   the RTS frame comprises a legacy preamble according to the IEEE 802.11a amendment, wherein the legacy preamble comprises a legacy signal (L-SIG) field and wherein a bit of the L-SIG field indicates that the RTS frame indicates the desired bandwidth; or
   the RTS frame comprises a Service field having two or more reserved bits according to the IEEE 802.11a amendment, wherein the reserved bits of the Service field indicate the desired bandwidth.

38. The apparatus of claim 37, wherein at least one of an in-phase (I) component or a quadrature (Q) component of the L-SIG field indicates that the RTS frame indicates the desired bandwidth.

39. The apparatus of claim 35, wherein the first control frame comprises a Request to Send (RTS) frame, wherein the RTS frame comprises a duration field, and wherein two or more least significant bits (LSBs) of the duration field indicate the desired bandwidth.

40. The apparatus of claim 39, wherein at least one most significant bit (MSB) of the duration field indicates that the RTS frame indicates the desired bandwidth.

41. The apparatus of claim 35, wherein the first control frame comprises a Request to Send (RTS) frame, wherein the RTS frame comprises a frame control field, and wherein two or more bits of the frame control field indicate the desired bandwidth.

42. The apparatus of claim 35, wherein the first control frame comprises a Request to Send (RTS) frame and wherein the RTS frame comprises:
 a preamble indicating whether a duplicate mode is used for a data portion of the RTS frame; and
 channel bandwidth bits indicating the desired bandwidth.

43. The apparatus of claim 42, wherein the preamble comprises a Very High Throughput Signal A (VHT-SIG-A) field having reserved bits and wherein one of the reserved bits of the VHT-SIG-A field indicates the duplicate mode.

44. The apparatus of claim 35, wherein the first control frame comprises a Request to Send (RTS) frame, wherein the RTS frame comprises a High Throughput Control (HTC) field, and wherein two or more bits of the HTC field indicate the desired bandwidth.

45. The apparatus of claim 35, wherein the first control frame comprises a Request to Send (RTS) frame, wherein the second control frame comprises a Clear to Send (CTS) frame, and wherein the RTS frame comprises a duration field indicating a Network Allocation Vector (NAV) covering reception of the CTS frame, time for a short interframe space (SIPS), and transmission of the data.

46. The apparatus of claim 35, wherein the first control frame comprises a Request to Send (RTS) frame and wherein the RTS frame comprises a frame format with a bandwidth information field indicating the desired bandwidth.

47. The apparatus of claim 46, wherein the RTS frame comprises:
 the frame format with the bandwidth information field; and
 a legacy preamble according to the Institute of Electrical and Electronics Engineers (IEEE) 802.11 a amendment to the IEEE 802.11 standard or a preamble indicating whether a duplicate mode is used for a data portion of the RTS frame.

48. The apparatus of claim 46, wherein the means for transmitting the first control frame is configured to transmit the RTS frame, with the bandwidth information field, on each of one or more channels for transmitting the data to the other apparatus according to the desired bandwidth and wherein the means for receiving the second control frame is configured to receive a Clear to Send (CTS) frame on each of at least a portion of the channels according to the available bandwidth of the other apparatus.

49. The apparatus of claim 48, wherein the means for transmitting IS further configured to transmit, to the other apparatus, a legacy RTS frame according to the Institute of Electrical and Electronics Engineers (IEEE) 802.11a amendment to the IEEE 802.11 standard, the legacy RTS frame being duplicated on each of the at least the portion of the channels; and wherein the means for receiving is further configured to receive a legacy CTS frame according to the IEEE 802.11a amendment, the legacy CTS frame being duplicated on each of the at least the portion of the channels, wherein a first Network Allocation Vector (NAV) set by the legacy RTS and legacy CTS frames protects transmission of the data.

50. The apparatus of claim 49, wherein the RTS frame comprises a duration field indicating a second Network Allocation Vector (NAV) covering reception of the CTS frame, time for a short interframe space (SIPS), and transmission of the legacy RTS frame.

51. The apparatus of claim 46, wherein the means for transmitting IS further configured to transmit, to the other apparatus, a legacy RTS frame according to the Institute of Electrical and Electronics Engineers (IEEE) 802.11a amendment to the IEEE 802.11 standard on a primary channel or duplicated on each of a first set of channels; wherein the means for receiving is further configured to receive a legacy Clear to Send (CTS) frame according to the IEEE 802.11a amendment on at least a portion of the first set of channels, wherein the at least the portion of the first set of channels are idle at the other apparatus; wherein the means for transmitting the first control frame is further configured to, after receiving the legacy CTS frame, transmit the RTS frame, with the bandwidth information field, on each of a second set of channels for transmitting the data to the other apparatus according to the desired bandwidth; and wherein the means for receiving the second control frame is further configured to receive a CTS frame on each of at least a portion of the second set of channels according to the available bandwidth of the other apparatus.

52. A non-transitory computer-readable medium comprising instructions executable to:
 transmit, to an apparatus, a first control frame indicating a desired bandwidth for transmitting data to the apparatus;
 receive a second control frame indicating an available bandwidth of the apparatus;
 determine a bandwidth for transmitting the data to the apparatus based on the lesser of the available bandwidth and the desired bandwidth; and
 transmit the data at the determined bandwidth, wherein the first control frame comprises a Request to Send (RTS) frame, wherein the RTS frame comprises a Service field having a scrambler initialization seed, and wherein the scrambler initialization seed of the Service field indicates the desired bandwidth.

53. An access point, comprising:
 at least one antenna;
 a transmitter configured to transmit, to an apparatus via the at least one antenna, a first control frame indicating a desired bandwidth for transmitting data to the apparatus; and
 a receiver configured to receive a second control frame indicating an available bandwidth of the apparatus; and
 a processor configured to determine a bandwidth for transmitting the data to the apparatus based on the lesser of the available bandwidth and the desired bandwidth, wherein the transmitter is further configured to transmit the data at the determined bandwidth, wherein the first control frame comprises a Request to Send (RTS) frame, wherein the RTS frame comprises a Service field having a scrambler initialization seed, and wherein the scrambler initialization seed of the Service field indicates the desired bandwidth.

54. A method for wireless communications, comprising:
 receiving, at an apparatus, from another apparatus, a first control frame indicating a desired bandwidth for sending data to the apparatus;
 in response to receiving the first control frame, transmitting a second control frame indicating an available bandwidth of the apparatus; and
 receiving the data at a bandwidth that is the lesser of the available bandwidth and the desired bandwidth, wherein the first control frame comprises a Request to Send (RTS) frame, and wherein the RTS frame comprises a Service field having a scrambler initialization seed, and wherein the scrambler initialization seed of the Service field indicates the desired bandwidth.

55. The method of claim 54, wherein the second control frame comprises a Clear to Send (CTS) frame and wherein the CTS frame comprises a legacy frame format according to the Institute of Electrical and Electronics Engineers (IEEE) 802.11a amendment to the IEEE 802.11 standard.

56. The method of claim 54, wherein the second control frame comprises a Clear to Send (CTS) frame, wherein the CTS frame comprises a legacy frame format according to the Institute of Electrical and Electronics Engineers (IEEE) 802.11a amendment to the IEEE 802.11 standard, and wherein at least one of:
the CTS frame comprises a legacy preamble according to the IEEE 802.11a amendment, wherein the legacy preamble comprises a legacy signal (L-SIG) field and wherein a bit of the L-SIG field indicates that the CTS frame indicates the available bandwidth; or
the CTS frame comprises a Service field having two or more reserved bits according to the IEEE 802.11a amendment, wherein the reserved bits of the Service field indicate the available bandwidth.

57. The method of claim 56, wherein at least one of an in-phase (I) component or a quadrature (Q) component of the L-SIG field indicates that the CTS frame indicates the available bandwidth.

58. The method of claim 54, wherein the second control frame comprises a Clear to Send (CTS) frame, wherein the CTS frame comprises a duration field, and wherein two or more least significant bits (LSBs) of the duration field indicate the available bandwidth.

59. The method of claim 58, wherein at least one most significant bit (MSB) of the duration field indicates that the CTS frame indicates the available bandwidth.

60. The method of claim 54, wherein the second control frame comprises a Clear to Send (CTS) frame, wherein the CTS frame comprises a frame control field, and wherein two or more bits of the frame control field indicate the available bandwidth.

61. The method of claim 54, wherein the second control frame comprises a Clear to Send (CTS) frame and wherein the CTS frame comprises:
a preamble indicating whether a duplicate mode is used for a data portion of the CTS frame; and
channel bandwidth bits indicating the available bandwidth.

62. The method of claim 61, wherein the preamble comprises a Very High Throughput Signal A (VHT-SIG-A) field having reserved bits and wherein one of the reserved bits of the VHT-SIG-A field indicates the duplicate mode.

63. The method of claim 54, wherein the second control frame comprises a Clear to
Send (CTS) frame, wherein the CTS frame comprises a High Throughput Control (HTC) field, and wherein two or more bits of the HTC field indicate the available bandwidth.

64. The method of claim 54, wherein the second control frame comprises a Clear to Send (CTS) frame and wherein the CTS frame comprises a frame format with a bandwidth information field indicating the available bandwidth.

65. The method of claim 64, wherein the CTS frame comprises a legacy preamble according to the Institute of Electrical and Electronics Engineers (IEEE) 802.11a amendment to the IEEE 802.11 standard or a preamble indicating whether a duplicate mode is used for a data portion of the CTS frame.

66. The method of claim 64, wherein receiving the first control frame comprises receiving a Request to Send (RTS) frame on each of one or more channels for sending the data to the apparatus according to the desired bandwidth and wherein transmitting the second control frame comprises transmitting the CTS frame, with the bandwidth information field, on each of at least a portion of the channels according to the available bandwidth of the apparatus.

67. The method of claim 66, further comprising:
receiving, at the apparatus, a legacy RTS frame according to the Institute of Electrical and Electronics Engineers (IEEE) 802.11a amendment to the IEEE 802.11 standard, the legacy RTS frame duplicated on each of the at least the portion of the channels; and
transmitting a legacy CTS frame according to the IEEE 802.11a amendment, the legacy CTS frame being duplicated on each of the at least the portion of the channels, wherein a Network Allocation Vector (NAV) set by the legacy RTS and legacy CTS frames protects reception of the data.

68. The method of claim 64, further comprising:
receiving, at the apparatus, a legacy Request to Send (RTS) frame according to the Institute of Electrical and Electronics Engineers (IEEE) 802.11a amendment to the IEEE 802.11 standard, the legacy RTS frame received on a primary channel or duplicated on each of a first set of channels; and
transmitting a legacy CTS frame according to the IEEE 802.IIa amendment on at least a portion of the first set of channels, wherein the at least the portion of the first set of channels are idle at the apparatus, wherein receiving the first control frame comprises, after transmitting the legacy CTS frame, receiving a RTS frame on each of a second set of channels for sending the data to the apparatus according to the desired bandwidth, and wherein transmitting the second control frame comprises transmitting the CTS frame, with the bandwidth information field, on each of at least a portion of the second set of channels according to the available bandwidth of the apparatus.

69. The method of claim 54, further comprising checking whether an address of the first control frame corresponds to a multichannel-capable entity before determining the desired bandwidth from the received first control frame, wherein the checking is based on the address belonging to a set of addresses.

70. An apparatus for wireless communications, comprising:
a receiver configured to receive, from another apparatus, a first control frame indicating a desired bandwidth for sending data to the apparatus; and
a transmitter configured to transmit, in response to receiving the first control frame, a second control frame indicating an available bandwidth of the apparatus,
wherein the receiver is further configured to receive the data at a bandwidth that is the lesser of the available bandwidth and the desired bandwidth, wherein the first control frame comprises a Request to Send (RTS) frame, and wherein the RTS frame comprises a Service field having a scrambler initialization seed, and wherein the scrambler initialization seed of the Service field indicates the desired bandwidth.

71. The apparatus of claim 70, wherein the second control frame comprises a Clear to Send (CTS) frame and wherein the CTS frame comprises a legacy frame format according to the Institute of Electrical and Electronics Engineers (IEEE) 802.11a amendment to the IEEE 802.11 standard.

72. The apparatus of claim 70, wherein the second control frame comprises a Clear to Send (CTS) frame, wherein the CTS frame comprises a legacy frame format according to the Institute of Electrical and Electronics Engineers (IEEE) 802.11a amendment to the IEEE 802.11 standard, and wherein at least one of:
- the CTS frame comprises a legacy preamble according to the IEEE 802.11a amendment, wherein the legacy preamble comprises a legacy signal (L-SIG) field and wherein a bit of the L-SIG field indicates that the CTS frame indicates the available bandwidth; or
- the CTS frame comprises a Service field having two or more reserved bits according to the IEEE 802.11a amendment, wherein the reserved bits of the Service field indicate the available bandwidth.

73. The apparatus of claim 72, wherein at least one of an in-phase (I) component or a
quadrature (Q) component of the L-SIG field indicates that the CTS frame indicates the available bandwidth.

74. The apparatus of claim 70, wherein the second control frame comprises a Clear to Send (CTS) frame, wherein the CTS frame comprises a duration field, and wherein two or more least significant bits (LSBs) of the duration field indicate the available bandwidth.

75. The apparatus of claim 74, wherein at least one most significant bit (MSB) of the duration field indicates that the CTS frame indicates the available bandwidth.

76. The apparatus of claim 70, wherein the second control frame comprises a Clear to Send (CTS) frame, wherein the CTS frame comprises a frame control field, and wherein two or more bits of the frame control field indicate the available bandwidth.

77. The apparatus of claim 70, wherein the second control frame comprises a Clear to Send (CTS) frame and wherein the CTS frame comprises:
- a preamble indicating whether a duplicate mode is used for a data portion of the CTS frame; and
- channel bandwidth bits indicating the available bandwidth.

78. The apparatus of claim 77, wherein the preamble comprises a Very High Throughput Signal A (VHT-SIG-A) field having reserved bits and wherein one of the reserved bits of the VHT-SIG-A field indicates the duplicate mode.

79. The apparatus of claim 70, wherein the second control frame comprises a Clear to Send (CTS) frame, wherein the CTS frame comprises a High Throughput Control (HTC) field, and wherein two or more bits of the HTC field indicate the available bandwidth.

80. The apparatus of claim 70, wherein the second control frame comprises a Clear to Send (CTS) frame and wherein the CTS frame comprises a frame format with a bandwidth information field indicating the available bandwidth.

81. The apparatus of claim 80, wherein the CTS frame comprises a legacy preamble according to the Institute of Electrical and Electronics Engineers (IEEE) 802.11a amendment to the IEEE 802.11 standard or a preamble indicating whether a duplicate mode is used for a data portion of the CTS frame.

82. The apparatus of claim 80, wherein the receiver is configured to receive the first control frame by receiving a Request to Send (RTS) frame on each of one or more channels for sending the data to the apparatus according to the desired bandwidth and wherein the transmitter is configured to transmit the second control frame by transmitting the CTS frame, with the bandwidth information field, on each of at least a portion of the channels according to the available bandwidth of the apparatus.

83. The apparatus of claim 82, wherein the receiver is further configured to receive a legacy RTS frame according to the Institute of Electrical and Electronics Engineers (IEEE) 802.11a amendment to the IEEE 802.11 standard, the legacy RTS frame duplicated on each of the at least the portion of the channels; and wherein the transmitter is further configured to transmit a legacy CTS frame according to the IEEE 802.11a amendment, the legacy CTS frame being duplicated on each of the at least the portion of the channels, wherein a Network Allocation Vector (NAV) set by the legacy RTS and legacy CTS frames protects reception of the data.

84. The apparatus of claim 80, wherein the receiver is further configured to receive a legacy Request to Send (RTS) frame according to the Institute of Electrical and Electronics Engineers (IEEE) 802.11a amendment to the IEEE 802.11 standard, the legacy RTS frame received on a primary channel or duplicated on each of a first set of channels; wherein the transmitter is further configured to transmit a legacy CTS frame according to the IEEE 802.11a amendment on at least a portion of the first set of channels, wherein the at least the portion of the first set of channels are idle at the apparatus; wherein the receiver is further configured to receive the first control frame by, after transmitting the legacy CTS frame, receiving a RTS frame on each of a second set of channels for sending the data to the apparatus according to the desired bandwidth; and wherein the transmitter is further configured to transmit the second control frame by transmitting the CTS frame, with the bandwidth information field, on each of at least a portion of the second set of channels according to the available bandwidth of the apparatus.

85. The apparatus of claim 70, further comprising a processing system configured to check whether an address of the first control frame corresponds to a multichannel-capable entity before determining the desired bandwidth from the received first control frame, wherein the checking is based on the address belonging to a set of addresses.

86. An apparatus for wireless communications, comprising:
- a means for receiving, from another apparatus, a first control frame indicating a desired bandwidth for sending data to the apparatus; and
- a means for transmitting, in response to receiving the first control frame, a second control frame indicating an available bandwidth of the apparatus,
- wherein the means for receiving is further configured to receive the data at a bandwidth that is the lesser of the available bandwidth and the desired bandwidth, wherein the first control frame comprises a Request to Send (RTS) frame, and wherein the RTS frame comprises a Service field having a scrambler initialization seed, and wherein the scrambler initialization seed of the Service field indicates the desired bandwidth.

87. The apparatus of claim 86, wherein the second control frame comprises a Clear to Send (CTS) frame and wherein the CTS frame comprises a legacy frame format according to the Institute of Electrical and Electronics Engineers (IEEE) 802.11a amendment to the IEEE 802.11 standard.

88. The apparatus of claim 86, wherein the second control frame comprises a Clear to Send (CTS) frame, wherein the CTS frame comprises a legacy frame format according to the Institute of Electrical and Electronics Engineers (IEEE) 802.11a amendment to the IEEE 802.11 standard, and wherein at least one of:
- the CTS frame comprises a legacy preamble according to the IEEE 802.11a amendment, wherein the legacy preamble comprises a legacy signal (L-SIG) field and wherein a bit of the L-SIG field indicates that the CTS frame indicates the available bandwidth; or the CTS frame comprises a Service field having two or more reserved bits according to the IEEE 802.11a amendment, wherein the reserved bits of the Service field indicate the available bandwidth.

89. The apparatus of claim 88, wherein at least one of an in-phase (I) component or a quadrature (Q) component of the L-SIG field indicates that the CTS frame indicates the available bandwidth.

90. The apparatus of claim 86, wherein the second control frame comprises a Clear to Send (CTS) frame, wherein the CTS frame comprises a duration field, and wherein two or more least significant bits (LSBs) of the duration field indicate the available bandwidth.

91. The apparatus of claim 90, wherein at least one most significant bit (MSB) of the duration field indicates that the CTS frame indicates the available bandwidth.

92. The apparatus of claim 86, wherein the second control frame comprises a Clear to Send (CTS) frame, wherein the CTS frame comprises a frame control field, and wherein two or more bits of the frame control field indicate the available bandwidth.

93. The apparatus of claim 86, wherein the second control frame comprises a Clear to Send (CTS) frame and wherein the CTS frame comprises:
a preamble indicating whether a duplicate mode is used for a data portion of the CTS frame; and
channel bandwidth bits indicating the available bandwidth.

94. The apparatus of claim 93, wherein the preamble comprises a Very High Throughput Signal A (VHT-SIG-A) field having reserved bits and wherein one of the reserved bits of the VHT-SIG-A field indicates the duplicate mode.

95. The apparatus of claim 86, wherein the second control frame comprises a Clear to Send (CTS) frame, wherein the CTS frame comprises a High Throughput Control (HTC) field, and wherein two or more bits of the HTC field indicate the available bandwidth.

96. The apparatus of claim 86, wherein the second control frame comprises a Clear to Send (CTS) frame and wherein the CTS frame comprises a frame format with a bandwidth information field indicating the available bandwidth.

97. The apparatus of claim 96, wherein the CTS frame comprises a legacy preamble according to the Institute of Electrical and Electronics Engineers (IEEE) 802.11a amendment to the IEEE 802.11 standard or a preamble indicating whether a duplicate mode is used for a data portion of the CTS frame.

98. The apparatus of claim 96, wherein the means for receiving the first control frame is configured to receive a Request to Send (RTS) frame on each of one or more channels for sending the data to the apparatus according to the desired bandwidth and wherein the means for transmitting the second control frame is configured to transmit the CTS frame, with the bandwidth information field, on each of at least a portion of the channels according to the available bandwidth of the apparatus.

99. The apparatus of claim 98, wherein the means for receiving is further configured to receive a legacy RTS frame according to the Institute of Electrical and Electronics Engineers (IEEE) 802.11a amendment to the IEEE 802.11 standard, the legacy RTS frame duplicated on each of the at least the portion of the channels; and wherein the means for transmitting is further configured to transmit a legacy CTS frame according to the IEEE 802.11a amendment, the legacy CTS frame being duplicated on each of the at least the portion of the channels, wherein a Network Allocation Vector (NAV) set by the legacy RTS and legacy CTS frames protects reception of the data.

100. The apparatus of claim 96, wherein the means for receiving is further configured to receive a legacy Request to Send (RTS) frame according to the Institute of Electrical and Electronics Engineers (IEEE) 802.11a amendment to the IEEE 802.11 standard, the legacy RTS frame received on a primary channel or duplicated on each of a first set of channels; wherein the means for transmitting is further configured to transmit a legacy CTS frame according to the IEEE 802.11a amendment on at least a portion of the first set of channels, wherein the at least the portion of the first set of channels are idle at the apparatus; wherein the means for receiving the first control frame is further configured to, after transmitting the legacy CTS frame, receive a RTS frame on each of a second set of channels for sending the data to the apparatus according to the desired bandwidth; and wherein the means for transmitting the second control frame is further configured to transmit the CTS frame, with the bandwidth information field, on each of at least a portion of the second set of channels according to the available bandwidth of the apparatus.

101. The apparatus of claim 86, further comprising means for checking whether an address of the first control frame corresponds to a multichannel-capable entity before determining the desired bandwidth from the received first control frame, wherein the checking is based on the address belonging to a set of addresses.

102. A non-transitory computer-readable medium comprising instructions executable to:
receive, at an apparatus from another apparatus, a first control frame indicating a desired bandwidth for sending data to the apparatus;
transmit, in response to receiving the first control frame, a second control frame indicating an available bandwidth of the apparatus; and
receive the data at a bandwidth that is the lesser of the available bandwidth and the desired bandwidth,
wherein the first control frame comprises a Request to Send (RTS) frame, and wherein the RTS frame comprises a Service field having a scrambler initialization seed, and wherein the scrambler initialization seed of the Service field indicates the desired bandwidth.

103. A wireless node, comprising:
at least one antenna;
a receiver configured to receive from another apparatus, via the at least one antenna, a first control frame indicating a desired bandwidth for sending data to the wireless node; and
a transmitter configured to transmit, in response to receiving the first control frame, a second control frame indicating an available bandwidth of the wireless node,
wherein the receiver is further configured to receive the data at a bandwidth that is the lesser of the available bandwidth and the desired bandwidth, wherein the first control frame comprises a Request to Send (RTS) frame, and wherein the RTS frame comprises a Service field having a scrambler initialization seed, and wherein the scrambler initialization seed of the Service field indicates the desired bandwidth.

* * * * *